United States Patent
Takatsuka et al.

(10) Patent No.: US 8,699,948 B2
(45) Date of Patent: Apr. 15, 2014

(54) CONNECTION METHOD FOR NEAR FIELD COMMUNICATION

(75) Inventors: Susumu Takatsuka, Tokyo (JP); Tetsuya Naruse, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 191 days.

(21) Appl. No.: 13/276,825

(22) Filed: Oct. 19, 2011

(65) Prior Publication Data

US 2012/0190299 A1      Jul. 26, 2012

Related U.S. Application Data

(60) Provisional application No. 61/435,964, filed on Jan. 25, 2011.

(51) Int. Cl.
*H04B 5/00* (2006.01)

(52) U.S. Cl.
USPC ........................ 455/41.1; 455/41.2; 455/404.2

(58) Field of Classification Search
USPC ............ 455/41.1, 41.2, 404.2, 405, 410, 411, 455/550.1, 556.1
See application file for complete search history.

(56) References Cited

U.S. PATENT DOCUMENTS

| | | | |
|---|---|---|---|
| 7,427,926 B2 * | 9/2008 | Sinclair et al. | 340/4.2 |
| 8,351,897 B2 * | 1/2013 | Shin et al. | 455/405 |
| 2007/0188323 A1 | 8/2007 | Sinclair et al. | |
| 2010/0167646 A1 | 7/2010 | Alameh et al. | |

FOREIGN PATENT DOCUMENTS

| | | |
|---|---|---|
| JP | 2007-243977 | 9/2007 |
| JP | 2010-056642 | 3/2010 |
| WO | WO 2010/023459 A1 | 3/2010 |

OTHER PUBLICATIONS

Extended Search Report issued Jun. 6, 2012 in European Patent Application No. 12150379.1-2414.
http://bu.mp/, "The Bump App for iPhone and Android, Bump Technologies, Inc.", p. 1.
Office Action issued Dec. 27, 2013 in Chinese Patent Application No. 201210009765.2 with English language translation.

* cited by examiner

*Primary Examiner* — Tuan H Nguyen
(74) *Attorney, Agent, or Firm* — Oblon, Spivak, McClelland, Maier & Neustadt, L.L.P.

(57) ABSTRACT

A host side wireless communication terminal and guest side wireless communication terminals are stacked together, for example. The wireless communication terminals each generate an access point list within a range wherein near field wireless communication can be performed. The host side wireless communication terminal stores the data of the vibratory waveform by the user tapping a finger or the like on the casing, as reference data. The guest side wireless communication terminals detect the vibratory waveforms propagated through the casing or the like of the host side device, set the vibratory waveform data as key data, and transmits this to the host side by near field wireless communication. Upon the key data and reference data matching, the host side wireless communication device performs near field wireless communication pairing between the wireless communication devices that have transmitted the key data thereof.

15 Claims, 23 Drawing Sheets

FIG. 8

| ACCESS POINT LIST | |
|---|---|
| TV | B456789 |
| PRINTER | E982443 |
| ROUTER | F723332 |
| CELLULAR PHONE | A123456 |
| CELLULAR PHONE | C234567 |
| PORTABLE GAMING DEVICE | D345678 |
| STATIONARY GAMING DEVICE | I236123 |
| PDA | H235221 |
| DIGITAL CAMERA | J346112 |
| PC | G123432 |
| PORTABLE GAMING DEVICE | K235156 |

CONNECTION METHOD FOR NEAR FIELD COMMUNICATION

CROSS REFERENCE TO RELATED APPLICATION

The present application claims the benefit of the earlier filing date of U.S. provisional patent application Ser. No. 61/435,964, filed Jan. 25, 2011, the entire contents of which being incorporated herein by reference.

TECHNICAL FIELD

The present invention relates to a near field communication connection method for when performing near field communication with a wireless communication device that can perform near field communication.

BACKGROUND ART

Recently cellular phones, table-type portable information terminals, portable gaming devices and so forth are often provided with a wireless LAN function called WiFi (registered trademark) and near field communication function such as the Bluetooth (registered trademark) communication function, for example.

For example, in the case that a wireless communication terminal having a wireless LAN function is paired with a wireless LAN access point, the wireless communication terminal first searches and lists the access points at which wireless communication can be made using wireless LAN. In the case that, in the access point list thereof, there is an access point regarding which authentication key settings and so forth have already been completed, the wireless communication terminal then pairs up with that access point. On the other hand, in the case that there is no access point, in the access point list, regarding which authentication key settings have been made, the wireless communication terminal displays the access point list on an internal display or the like, for example, and prompts the user to select the desired access point. Further, the wireless communication terminal requests the user to input an authentication key for the selected access point, and in the case that the correct authentication key is input by the user, the pairing with the access point thereof is completed. Thus, the wireless communication terminal can communicate with the access point using a wireless LAN.

Note that as a method of pairing that has been used up to now for near field wireless communication, for example Japanese Unexamined Patent Application Publication No. 2010-56642 (hereinafter, Patent Literature 1) discloses an acceleration sensor pairing system wherein, when operations to hold a first terminal and second terminal together and move or vibrate these are performed, based on path-of-movement information of the terminals from such operations, the first terminal and second terminal thereof are paired. That is to say, with the acceleration sensor pairing system described in Patent Document 1, the first terminal calculates the path-of-movement information indicating the vibratory paths-of-movement in the event that the terminal vibrates, based on the acceleration information detected by the acceleration sensor when the terminal is made to vibrate by the user. Similarly, the second terminal computes the path-of-movement information wherein the input operations to the terminal is expressed as the path-of-movement in input coordinates when input operations are performed by the user to cause the second terminal to vibrate in conjunction with the vibrations of the first terminal. The acceleration sensor pairing system compares the path-of-movement information computed by the first terminal and the path-of-movement information computed by the second terminal, and when these approximately match, pairs the first and second terminals together.

Also, as a method of pairing that has been used up to now for near field wireless communication, for example Japanese Unexamined Patent Application Publication No. 2007-243977 (hereinafter, Patent Literature 2) discloses a connection destination selection method for a wireless LAN between an electronic camera and communication terminal. That is to say, with the wireless LAN connection destination selection method described in Patent Literature 2, upon entering a mutual communication range, the electronic camera and communication terminal recognize one another. Subsequently, the electronic camera sounds a buzzer at fixed intervals as to the communication terminal, and if receiving the buzzer sound, the communication terminal transmits information to the electronic camera indicating that the buzzer sound has been received. Further, the electronic camera transmits a "buzzer reply" indicating that the buzzer sound has been received from the communication terminal and confirmed. After receiving the buzzer reply, the communication terminal allows a LAN connection with the electronic camera.

In addition, non-Patent Literature 1 discloses a method for bumping terminal and terminal that are to be paired, wherein pairing is performed based on the position information and point-in-time of the bumping.

CITATION LIST

Patent Literature

[PTL 1] Japanese Unexamined Patent Application Publication No. 2010-56642 (FIG. 10)

[PTL 2] Japanese Unexamined Patent Application Publication No. 2007-243977 (FIG. 8)

Non Patent Literature

[NPL 1] Internet <URL: http://bu.mp/>, searched Oct. 19, 2010

SUMMARY OF INVENTION

Technical Problem

Now, the above-described near field wireless communication pairing methods are all methods for pairing one-to-one. Therefore, in the case of realizing one-to-many field wireless communication, the one-to-one pairing work has to be repeated multiple times. In other words, pairing methods to date cannot complete pairing for one-to-many connections at one time. In the case of wireless LAN for example, a server is needed on the network thereof, and for example pairings cannot be completed by locally connecting the wireless communication terminals to one another.

The present invention has been made in light of this current state, and it is an object thereof to provide a connection method for near-field wireless communication wherein desired wireless communication devices which are capable of near-field wireless communication can be readily paired, and also wherein one-to-many pairings can be completed approximately simultaneously.

Solution to Problem

The near field wireless communication connection method of the present invention includes a step for the list generating unit to generate a list of wireless communication devices that can perform near field wireless communication with a near field wireless communication unit, a step for the vibratory waveform detecting unit to detect physical vibratory waveforms transmitted via a predetermined vibratory waveform medium, and a step for the storage unit to store the physical vibratory waveform data detected by the vibratory waveform detecting unit, as reference data. The near field wireless communication connection method of the present invention also includes a step to receive the key data corresponding to physical vibratory waveforms similar to the vibratory waveforms detected by the vibratory waveform detecting unit from the wireless communication devices in the list, through the near field wireless communication unit, and upon determining that the key data and the reference data stored in the storage unit match, the control unit performing near field wireless communication pairing with the wireless communication device that has transmitted the key data thereof. Thus, the near field wireless communication connection method of the present invention solves the above-described problems.

Also, the near field wireless communication connection method of the present invention includes a step for the list generating unit to generate a list of wireless communication devices that can perform near field wireless communication with a near field wireless communication unit, a step for the vibratory waveform detecting unit to detect physical vibratory waveforms transmitted via a predetermined vibratory waveform medium, and a step for the storage unit to store the physical vibratory waveform data detected by the vibratory waveform detecting unit, as key data. The near field wireless communication connection method of the present invention also includes a step, wherein, upon transmitting the key data stored in the storage unit to the wireless communication device serving as the near field wireless communication host out of the wireless communication devices in the list, through the near field wireless communication unit, the control unit performs near field wireless communication pairing with the wireless communication device serving as host. Thus, the near field wireless communication connection method of the present invention solves the above-described problems.

Also, the near field wireless communication connection method of the present invention includes a step for the list generating unit to generate a list of wireless communication devices that can perform near field wireless communication with a near field wireless communication unit, and a step for the vibratory waveform output unit to output physical vibratory waveforms generated based on identification information of the device itself through a predetermined vibratory waveform medium. The near field wireless communication connection method of the present invention also includes a step, wherein, upon the vibratory waveform output unit outputting the physical vibratory waveforms, a connection notification transmitted from a wireless communication device within the list is received from the near field wireless communication unit, the control unit performs near field wireless communication with the wireless communication device that has transmitted the connection notification. Thus, the near field wireless communication connection method of the present invention solves the above-described problems.

Also, the near field wireless communication connection method of the present invention includes a step for the list generating unit to generate a list including identification information of wireless communication devices that can perform near field wireless communication with a near field wireless communication unit, a step of the vibratory waveform detecting unit to detect the physical vibratory waveforms generated based on the identification information of the wireless communication device at the transmission source and transmitted through the predetermined vibratory waveform medium, and a step for the storage unit to store the physical vibratory waveform data detected by the vibratory waveform detecting unit, as key data. The near field wireless communication connection method of the present invention also includes a step, wherein, the identification information of the wireless communication devices in the list serve as reference data, and the reference data and key data match, the control unit performs near field wireless communication pairing with the wireless communication device corresponding to the reference data. Thus, the near field wireless communication connection method of the present invention solves the above-described problems.

In other words, according to the present invention, when physical vibratory waveform data that is transmitted via a predetermined vibratory waveform medium can be shared between wireless communication devices to be paired, pairing can be performed between such wireless communication devices.

Advantageous Effects of Invention

According to the present invention, reference data corresponding to at least one of the devices of a list of wireless communication devices that are capable of near field wireless communication is stored, the vibratory waveform data wherein the waveform of the physical vibrations transmitted via a predetermined vibratory waveform medium is detected is set as key data, and when the key data and reference data match, near field wireless communication pairing of the wireless communication devices corresponding to the reference data and key data respectively is completed. Thus, according to the present invention, desired wireless communication devices capable of near-field wireless communication can be readily paired together, and also one-to-many pairings can be completed approximately simultaneously.

BRIEF DESCRIPTION OF DRAWINGS

FIG. 8 is a diagram illustrating an example of an access point list, and in particular illustrates an example of a category name for each wireless communication device and IDs of each device.

DESCRIPTION OF EMBODIMENTS

Figure 1:
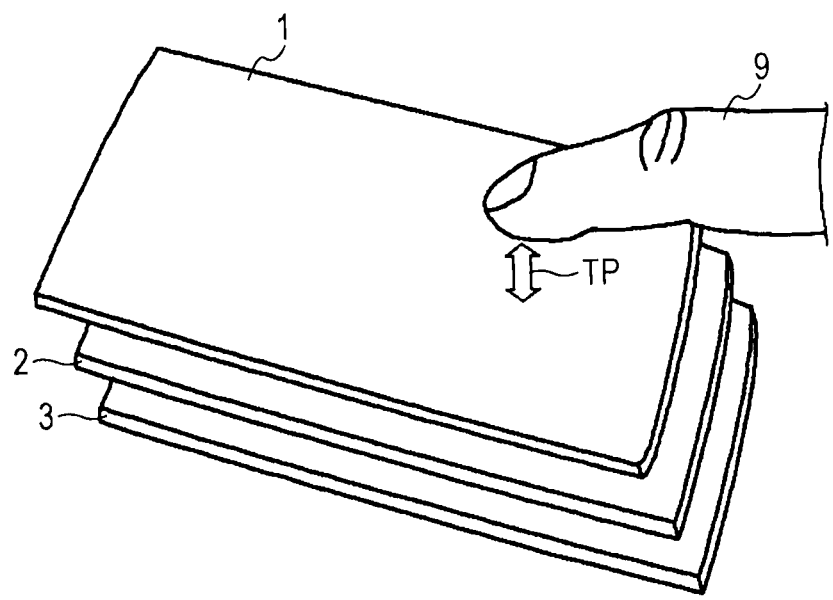
FIG. 1 is a diagram used to describe a pairing method according to an embodiment of the present invention whereby a vibratory waveform applied externally to the casing of one of three layered wireless communication terminals is shared with the remaining terminals to create pairings between each of the terminals.

An embodiment of the present invention will be illustrated with reference to the diagrams.

Pairing methods of performing near field wireless communication in the event of two or more multiple wireless communication terminals having near field wireless communication functions such as wireless LAN communication like so-called WIFI (registered trademark) and BLUETOOTH (registered trademark) communication, will be described according to the embodiments of the present invention. Also, terminals according to the present embodiment that a user can carry, such as cellular phones, portable gaming devices, and portable tablet terminal, each having near field wireless communication functions, will be given as examples of wireless communication terminals according to the present invention.

Also, a near field wireless communication system that enables connection settings for direct pairings between near field wireless communication terminals without going through a wireless router, such as so-called WiFi Direct (registered trademark) for which standardization has been advanced as of recent, for example, will be given as an example of an embodiment of the present invention. That is to say, with the near field wireless communication system according to the present embodiment, all wireless communication devices including the wireless router can each become an access point. Therefore, the wireless communication devices according to this system can be paired without going through a wireless router, and for example one-to-many connections can be made.

Further, the two or more multiple wireless communication terminals according to the embodiments of the present invention can execute pairing control application programs according to the present invention which will be described later, and we will say that prior to starting near field wireless communication between these terminals, the pairing control application program is in a state of having been started up.

According to the present embodiment, the wireless communication terminals after the pairing control application program having been started up scan all of the wireless communication devices existing in the area where near field wireless communication is enabled, and generate an access point list including all of the wireless communication devices obtained by such scanning.

Note that according to the present embodiment, the wireless communication devices existing in the area where near field wireless communication is enabled include not only the above-described portable wireless communication terminals according to the embodiments of the present invention but also include the above-mentioned wireless router, as well as digital television receivers recording/playing devices, personal computers, and other types of household electronic devices, each having near field wireless communication functions.

Also, according to the present embodiment, the above-mentioned access point list may include information of categories to which the wireless communication devices belong, version information of the wireless communication devices, electronic wave level information of near field wireless communication for the wireless communication devices, security level information of near field wireless communication, information unique to the application programs being executed, and so forth, as well as IDs to identify these wireless communication devices.

A wireless communication device ID is an identification number uniquely assigned to each device (e.g., a so-called MAC address, etc.). The wireless communication device category information is information indicating how the wireless communication devices will be classified; for example, the category of portable terminals, category of stationary television receivers, category of recording/playing devices, category of personal computers, and so forth. The wireless communication device version information is information that can be used in the event of determining whether or not the version of the wireless communication device corresponds to the pairing control according to the present invention. The electronic wave level information of near field wireless communication is information indicating the strength of transmission/reception waves. The security level information of near field wireless communication is information indicating whether or not the communication device corresponds to encoding and the level of such encoding. The information unique to the application programs being executed is information indicating that the pairing control application program according to the embodiments of the present invention has been started and is in an executable state, as an example. The information in the access point list is simply an example, and the access point lists according to the present embodiment may include additional various types of information.

The pairing methods according to the embodiments of the present invention will be described below.

[Pairing Method of First Embodiment]

In the case of pairing two or more multiple wireless communication terminals after the pairing control application program according to the present invention, as a first embodiment of the present invention, first, each of the multiple terminals are in a state of being stacked together, in a state wherein a portion of the casings are in contact, or in a state of being placed in the vicinity of one another on a table or the like. In other words, according to the present embodiment, the multiple wireless communication terminals are disposed so as to enable transmitting to all of the other terminals at approximately the same time, i.e. disposed so that vibration applied externally can be shared between each of the terminals.

That is to say, according to the present embodiment, in the case that vibration is applied externally to one of the terminals, for example, while the wireless communication terminals are in a stacked state, the vibration thereof will be transmitted to the casings of the other terminals at approximately the same time through the casing of the terminals that are in the stacked state. Similarly, in the case that vibration is applied externally to one of the terminals while the wireless communication terminals are in a state wherein a portion of the casings are in contact, the vibration thereof will be transmitted to the casings of the other terminals at approximately the same time through the casing of the terminals that are in the state of being in contact. Also, in the case that vibration is applied externally to one of the terminals which the wireless communication terminals are placed in the vicinity of one another on a table or the like having high vibration transmittance, or in the case that vibration is applied externally to the table itself, the vibration thereof will be transmitted to the casings of the other terminals at approximately the same time through the table or the like.

Thus according to the present embodiment, the multiple wireless communication terminals are disposed so as to be stacked together, placed with a portion of the casings in contact with one another, or in the vicinity of one another on a table or the like, so that externally applied vibration is transmitted to all of the terminals at approximately the same time.

Note that whether the multiple terminals are disposed in a stacked state, in a state that a portion of the casing are in contact with one another, or disposed in the vicinity of one another so that the same vibration is shared at approximately the same time, is optional. However, in the case of considering transmitting the vibration accurately to the other terminals, disposing the multiple terminals so as to be stacked together is more desirable. FIG. 1 shows an example of three wireless terminals 1 through 3, for example, being in a stacked state.

Also, with the pairing method according to the present embodiment, of the multiple wireless communication terminals disposed so that the same vibration is shared therein at approximately the same time, a terminal to serve as the host in the event of pairing is determined. Note that with the present embodiment, the wireless communication terminals other than the host terminal will be called guest terminals.

In the first embodiment of the present invention, which of the multiple wireless communication terminals becomes the host terminal is determined according to user selection instructions, for example. That is to say, for example, a terminal wherein instructions are input by the user to become the host terminal becomes the host terminal, and the other terminals become guest terminals. Note that guest terminals may also be determined by user instructions. The timing to determine the host terminal may be at any timing, before the terminals are disposed as described above, or after the terminals are disposed.

Also, according to the present embodiment, the relative disposal relation between the host terminal and the guest terminals are not particularly restricted, but in the case that the state of stacking the multiple terminals as described above is to be used, placing the host terminal on top is desirable. Note that in the example in FIG. 1, the wireless communication terminal 1 is the host terminal, and the wireless communication terminals 2 and 3 are the guest terminals.

Next, upon the terminals having been disposed and the host terminal decision having been made as described above, with the pairing method according to the present embodiment, a physical vibration is applied externally thereto, as described above.

Now, in the case of applying vibration externally as to the host terminal, the vibration thereof can be vibration from the user lightly striking (tapping) the host terminal with a finger or the like, for example.

The example in FIG. 1 shows a state wherein the wireless communication terminal 1 serving as the host terminal is in a state of external vibration being applied by the user tapping the terminal with finger 9 or the like as shown by arrow TP in the diagram.

It goes without saying that according to the present embodiment, the externally-applied vibrations may be vibrations applied by anything, and are not restricted to tapping by the user. Note that in a case wherein each terminal is disposed near each other on a table or the like as describe above, for example, the vibration applied externally may be vibrations from the user tapping the table or the like with the finger 9 or a hand.

According to the present embodiment, the host terminal detects the waveform of the externally applied vibrations, and temporarily stores the vibratory waveform data in an internal memory or the like as one-time reference data for the event of pairing. Note that the host terminal can detect the vibratory waveforms with an accelerometer (acceleration sensor), gyroscope, or compass sensor, or a combination of such sensors.

Also, according to the present embodiment, each guest terminal detects the waveforms of the transmitted vibrations, and temporarily stores the vibratory waveform data thereof in an internal memory or the like. The guest terminals then transmit the vibratory waveform data stored in the internal memory or the like to the host terminal as one-time key data for the event of pairing. Note that similar to the host terminal, the guest terminals can detect the vibratory waveforms with an accelerometer, gyroscope, or compass sensor, or a combination of such sensors.

Next, upon receiving the one-time key data transmitted from the guest terminals, the host terminal compares the received one-time key data with the one-time reference data stored in the internal memory or the like. From this comparison, in the case that one-time key data matches the one-time reference data, the host terminal completes the pairing with the guest terminal that has transmitted the one-time key data. Similarly, the host terminal compares the one-time reference data with the one-time key data transmitted from the other guest terminals, and completes a pairing with the guest terminals with which the data matches.

Thus, the host terminal and each guest terminal can have mutual near field wireless communication.

Note that in the event of comparing the one-time reference data and the one-time key data, a certain amount of a comparison margin is desirable. That is to say, since the vibrations are transmitted through the casings of the terminals and a table or the like, there may be a certain amount of difference between the vibratory waveform data detected by the host terminal and the vibratory waveform data detected by the guest terminals. Therefore, in the event of comparing the one-time reference data and the one-time key data, it is desirable to have a comparison margin that can absorb the difference amount.

According to the pairing method of the first embodiment of the present invention, the wireless communication terminals are disposed as described above so that each shares the vibrations, the vibratory waveform data detected by each terminal is used as one-time reference data and key data for the event of pairing, and pairing is completed between terminals wherein the data approximately matches. Thus, the wireless communication terminals having completed pairing are enabled for near field wireless communication.

Also, according to the pairing method of the present embodiment, pairing is enabled only in the case that approximately the same vibratory waveform is detected between the wireless communication terminals. Therefore, in the case that different vibratory waveforms are detected between wireless communication terminals, pairing is not performed, whereby the user does not pair terminals in error unintentionally.

Figure 2A:
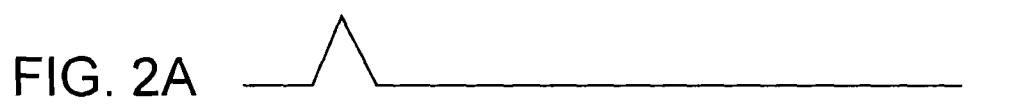
FIG. 2 is a waveform diagram illustrating an example of a vibratory waveform detected with each terminal in the event that three wireless communication terminals are disposed as shown in FIG. 1, for example.
Figure 2B:
Figure 2C:
Figure 3A:
FIG. 3 is a waveform diagram illustrating an example of a vibratory waveform occurring due to a user tapping one of the three wireless communication terminals disposed as shown in FIG. 1, for example, and an example of a vibratory waveform transmitted to other terminals.
Figure 3B:
Figure 3C:

For example, FIG. 2 shows the vibratory waveforms detected by each terminal before the three wireless communication terminals 1 through 3 are stacked or in the event of being stacked, and FIG. 3 shows an example of the vibratory waveform transmitted to the terminals by the user tapping the host terminal, for example, when the three wireless communication terminals 1 through 3 are in a stacked state as in FIG. 1. Note that FIGS. 2A and 3A show examples of a vibratory waveform detected by the wireless communication terminal 1, FIGS. 2B and 3B show examples of a vibratory waveform detected by the wireless communication terminal 2, and FIGS. 2C and 3C show examples of a vibratory waveform detected by the wireless communication terminal 3.

That is to say, as shown in FIG. 2, the vibratory waveforms, at the time when the terminals detect the vibration before the three wireless communication terminals 1 through 3 are stacked or in the event of being stacked, are each different in wireless communication terminals 1 through 3. On the other hand, as shown in FIG. 3, in the case that the three wireless communication terminals 1 through 3 are already in a stacked state, for example the user may tap the terminal 1 whereby the vibratory waveform transmitted to the other terminals 2 and 3 have approximately the same waveform.

Thus, according to the present embodiment, the vibratory waveform before the three wireless communication terminals 1 through 3 are stacked or in the event of being stacked, and the vibratory waveform transmitted through the wireless communication terminals 1 through 3 that are already in a stacked state can be differentiated. Accordingly, with the pairing method of the present embodiment, pairings are not made in error from vibratory waveforms other than the vibratory waveform transmitted through the wireless communication terminals 1 through 3 that have been disposed so as to share the vibration among the terminals.

[Pairing Method of Second Embodiment]

According to the description of the first embodiment, an example is given wherein a user taps the host terminal, but according to the present invention, the terminal tapped by the user may be any one of the guest terminals as desired by the user, as in the pairing method according to a second embodiment described below.

That is to say, in a case wherein terminals are disposed similarly so as to share the vibrations, the guest terminal tapped by the user detects the vibratory waveform generated by the tapping, thereby temporarily storing the vibratory waveform data as one-time key data, and transmitting the one-time key data to the host terminal.

Also, upon detecting the vibrations transmitted by the user tapping the desired guest terminal, the other guest terminals excluding the tapped guest terminal temporarily stores the vibratory waveform data as one-time key data, and transmits the one-time key data to the host terminal.

On the other hand, upon detecting the vibrations transmitted by the user tapping the guest terminal desired by the user, the host terminal stores the vibratory waveform data as the one-time reference data. Also, in the case that the one-time key data is transmitted from the guest terminals, the host terminal similarly compares this one-time key data with the one-time reference data. In the case that the one-time key data and the one-time reference data approximately match, the host terminal completes the pairing with the guest terminal that has transmitted this one-time key data.

Thus, similar to the above-described first embodiment, according to the pairing method of the second embodiment also, the wireless communication terminals having completed pairings are enabled for near field wireless communication, and also in the case that the vibratory waveforms detected between the terminals differ, pairing is not performed, whereby the user does not pair the terminals in error unintentionally.

[Pairing Method of Third Embodiment]

According to the pairing method of the first embodiment, an example is given wherein pairing is performed using the vibratory waveforms at the time that the host terminal is tapped, but according to the present invention, the vibrations shared among the terminals may be vibrations that the host terminal itself has generated for example, as in the pairing method according to a third embodiment described below.

That is to say, in the case of the third embodiment, the host terminal generates vibrations itself by operating an inter vibrator, for example. Thus, the vibrations generated by the host terminal are transmitted to the other terminals disposed similar to that in the first embodiment.

In the case that the terminals are similarly disposed, upon detecting the vibrations that the host terminal has generated, the guest terminal temporarily stores the vibration waveform data thereof as one-time key data, and sends the one-time key data to the host terminal.

On the other hand, the host terminal stores the vibration waveform data generated by itself as the one-time reference data, and if one-time key data is transmitted from the guest terminals, similarly to the above descriptions compares this one-time key data to the one-time reference data. In the case that the one-time key data and one-time reference data matches, the host terminal completes the pairing with the guest terminal that has transmitted the one-time key data.

Thus, with the pairing method according to the third embodiment, similar to the first embodiment, the wireless communication terminals having completed pairing are enabled for near field wireless communication, and also in the case that the vibratory waveforms detected between the terminals differ, pairing is not performed, whereby the user does not pair the terminals in error unintentionally.

Also, in the case of the third embodiment, the host terminal itself can generate vibrations, whereby, for example, the waveform pattern of the vibration thereof can be a uniquely identifiable waveform pattern, or the frequency of the vibratory waveform can be a uniquely identifiable frequency, or the combination of size (amplitude) of the vibration waveform and frequency can be a uniquely identifiable combination.

If a pattern is used as a uniquely identifiable waveform pattern, which is completely different from the waveform pattern of the vibrations generated when an impact or the like unexpected by the user is applied externally, for example, the user can be prevented from unintentionally pairing due to the impact or the like. Also, for example, if a uniquely identifiable waveform pattern is generated based on the predetermined information such as an ID or the like of the host terminal, for example, the predetermined information can be transmitted from the host terminal to the guest terminal with the transmittance of the identifiable waveform pattern. It goes without saying that in this case, the guest terminal has a function to restore the predetermined information from the transmitted identifiable waveform pattern. Note that in the case that an identifiable waveform pattern corresponding to the host terminal ID or the like is used, how to use the ID restored from the identifiable waveform pattern thereof to perform pairing can be the same method as audio transmittance of an ID and reference or the like according to a later-described sixth embodiment, for example.

If a frequency is used as a uniquely identifiable waveform pattern, which is completely different from the vibrator vibration frequency that is for incoming call notification of a cellular phone, for example, the user can be prevented from unintentionally pairing by detecting the vibrator vibration for incoming call notification. Also, for example, if a uniquely identifiable frequency is used that is correlated to predetermined information such as an ID or the like of the host terminal, for example, the predetermined information can be transmitted from the host terminal to the guest terminal by the vibration transmittance of the identifiable frequency. It goes without saying that in this case, the guest terminal has a function to restore the predetermined information from the transmitted uniquely identifiable frequency. Note that in the case that an identifiable frequency corresponding to the host terminal ID or the like is used, how to use the ID restored from the identifiable frequency thereof to perform pairing can be the same method as audio transmittance of an ID and reference or the like according to a later-described sixth embodiment, for example.

A case of combining the vibratory waveform same and frequency to create a uniquely identifiable combination is similar to the above description, pairings performed in error can be prevented, and also predetermined information such as an ID can be transmitted.

[Pairing Method of Fourth Embodiment]

According to the pairing method of the third embodiment, an example is given wherein the host terminal itself generates vibrations, but according to the present invention, the vibrations by a vibrator or the like may be vibrations generated by the guest terminal itself, as in the pairing method according to a fourth embodiment described below.

That is to say, as the fourth embodiment, one of the guest terminals desired by the user generates vibrations itself by operating an internal vibrator, for example. Thus, the vibrations generated by the guest terminal itself are transmitted to the other terminals disposed similar to that in the first embodiment.

In the case that the terminals are similarly disposed, the guest terminal desired by the user temporarily stores the waveform data of the vibrations generated by itself as one-time key data, and transmits the key data thereof to the host terminal.

Also, upon detecting the vibrations transmitted that the guest terminal desired by the user has generated, the other guest terminals except for the guest terminal desired by the user temporarily stores the vibratory waveform data as the one-time key data, and transmit the one-time key data to the host terminal.

On the other hand, upon detecting the vibrations transmitted that the guest terminal desired by the user has generated, the host terminal stores the vibratory waveform data as the one-time reference data, and if the one-time key data is transmitted from the guest terminals, similarly the one-time key data and one-time reference data are compared. In the case that the one-time key data and one-time reference data match, the host terminal completes the pairing with the guest terminal that has transmitted the one-time key data.

Thus, similar to the first embodiment, with the pairing method according to the fourth embodiment also, the wireless communication terminals having completed pairing are enabled for near field wireless communication, and in the case that the vibratory waveforms detected between terminals are different, pairing is not performed, whereby the user does not pair the terminals in error unintentionally.

Also, similar to the third embodiment, in the case of the fourth embodiment also, the guest terminals can generate vibrations themselves, whereby the waveform patterns of the vibrations thereof can become a uniquely identifiable waveform pattern, the frequency of the vibrator waveform can become a uniquely identifiable frequency, and the combination of vibratory wave form size (amplitude) and frequency can become a uniquely identifiable combination.

If a pattern is used as a uniquely identifiable waveform pattern, which is completely different from the vibratory waveform pattern that is generated when an unexpected impact is applied externally, similar to the above description, the user can be prevented from unintentionally pairing by the unexpected impact. Also, if a uniquely identifiable pattern is generated based on predetermined information such as an ID or the like of the guest terminal, for example, the predetermined information can be transmitted from the host terminal to the guest terminal by transmittance of the identifiable waveform pattern. It goes without saying that in this case, the host terminal has a function to restore the predetermined information from the transmitted identifiable waveform pattern.

The same can be said in the case of using a uniquely identifiable frequency or in the case of turning a combination of the size of vibratory waveform and frequency into a uniquely identifiable combination, whereby pairing in error can be prevented, and transmitting predetermined information such as an ID or the like is enabled.

[Pairing Method of Fifth Embodiment]

According to the pairing method of the first through fourth embodiments, examples are given wherein the user selects and determines the host terminal, but according to the present invention, the host terminal may be automatically determined from the terminals that are in the disposed state where the vibrations can be shared between the terminals, as in the pairing method according to a fifth embodiment described below.

According to the fifth embodiment, based on the above-described access point list information, determination is made as to whether each of multiple wireless communication terminals that are in a state of being disposed such that the vibrations can be each shared will be the host terminal or a guest terminal, and based on the determination results thereof, each terminal itself determines whether it is to be the host terminal or a guest terminal.

According to the fifth embodiment, as an example, if each ID in the access point list and the ID of the terminal itself are compared, and these IDs are aligned in ascending order or descending order, in the case that the terminal that becomes the first in order determines itself to be the host terminal, and otherwise the terminal determines itself to be a guest terminal.

In the event of comparing the IDs, determination can be made as to which will be first in ascending order or descending order, using only information of a lower predetermined digit of the ID numbers thereof, or higher predetermined digit, or a predetermined number of digits on the higher side or lower side of a certain base digit. Also, in the case that there are two or more IDs having the same predetermined number of digits information, the number of digits can be expanded by one digit, creating a new predetermined number of digits information, and determination can be made for ascending/descending order, such processing to be repeated until there is only one ID having the same predetermined number of digits information.

Also, determination as to whether a terminal will be the host terminal or a guest terminal may be made using an ascending/descending order of an ASCII code corresponding to the IDs (in order of large size or in order of small size of the ASCII codes), or an ascending/descending order of a shared constant wherein a constant that is shared between terminals such as date and time information, for example, is used as a base (in order of early date/time or in order of late date/time).

Further, in the event of comparing the IDs, the wireless communication terminals according to the present embodiment also compares one of category information in the access point list, version information, wave level information, information unique to the application programs that are being executed, or security level information, or a combination thereof, whereby other wireless communication devices corresponding to the IDs in the access point list can be determined as to whether the device can be paired or should be paired or not.

As an example, the wireless communication terminal according to the present embodiment compares the category information, and thereby can determine whether or not the wireless communication device corresponding to the IDs in the access point list are terminals that can pair with the wireless communication terminal according to the present embodiment or are terminals that should pair with the wireless communication terminal according to the present embodiment.

That is to say, in the case of this example, by comparing the category information within the access point list, the wireless communication terminals according to the present embodiment can determine whether the wireless communication device corresponding to each ID is a portable wireless communication terminal according to the present embodiment or is a stationary device such as a television receiver, recording/playing device, personal computer, or household electronic device (a device that is not a portable wireless communication terminal according to the present embodiment).

Thus, with the wireless communication terminal according to the present embodiment, only a portable wireless communication terminal is a pairing candidate, i.e. a stationary device can be excluded from being a pairing candidate.

The wireless communication terminals according to the present embodiment reference only the IDs corresponding to terminals that are the pairing candidates, i.e. references only IDs corresponding to devices belonging to the same type of category as the portable terminal, and determine whether each will be the host terminal itself or a guest terminal, as described above.

Also, for example, by referencing the category information, determination can be made as to whether or not the version of the wireless communication device corresponding to the IDs within the access point list corresponds to the pairing control of the present embodiment.

Thus, with the wireless communication terminal according to the present embodiment, only a wireless communication terminal corresponding to the pairing control according to the present embodiment is a pairing candidate, i.e. a device not corresponding to the version thereof can be excluded from being a pairing candidate.

The wireless communication terminals according to the present embodiment reference only the IDs corresponding to terminals that are the pairing candidates, i.e. reference only IDs corresponding to devices having the version corresponding to the pairing control, and determine whether each will be the host terminal itself or a guest terminal, as described above.

Also, for example, the wireless communication terminals disposed so that sharing of the vibrations is enabled are thought to be extremely close to each other, whereby the strength of the transmission/reception waves between the terminals are thought to be extremely strong having a clear difference than between the other wireless communication devices. Therefore, if the wave level information in the access point list is referenced, estimations can be made as to whether the wireless communication devices corresponding to each of the IDs within the list are very close to each other or whether the devices are disposed at a distance from each other.

That is to say, in this example, the wireless communication terminals according to the present embodiment reference the wave level information of the access point list, and thereby can determine whether the wireless communication devices corresponding to each ID are wireless communication terminals that are disposed nearby so as to share the vibrations or whether the wireless communication devices exist in a position at a distance therefrom.

Thus, with the wireless communication terminals according to the present embodiment, only the wireless communication terminals that are disposed close to each other so as to share the vibrations are pairing candidates, and wireless communication terminals disposed at a distance can be excluded from being pairing candidates.

With the wireless communication terminals according to the present embodiment, only the IDs corresponding to the terminals that are pairing candidates, i.e. only IDs corresponding to terminals that are measured as having been disposed at a distance whereby the vibrations can be shared due to the wave levels are of a certain level are referenced, and each determines whether itself will be the host terminal or a guest terminal.

Also, for example, by referencing information unique to the application program being executed, the wireless communication terminals according to the present embodiment can determine whether or not each of the wireless communication corresponding to each ID in the access point list can be or should be paired with the terminal itself.

That is to say, in the case of this example, by referencing information unique to the application program in the access point list, the wireless communication terminals according to the present embodiment can determine whether the wireless communication devices corresponding to each ID are wireless communication devices in a state wherein the pairing control application program according to the present invention has been started, or whether the wireless communication device is in a state of not having the program started.

Thus, with the wireless communication terminals according to the present embodiment, only the wireless communication terminals that are executing the pairing control application program according to the present embodiment are pairing candidates, i.e., wireless communication terminals disposed not executing the program can be excluded from being pairing candidates.

With the wireless communication terminals according to the present embodiment, only the IDs corresponding to the terminals that are pairing candidates, i.e. only IDs corresponding to terminals that are executing the pairing control application program are referenced, and each determines whether itself will be the host terminal or a guest terminal.

Additionally, the wireless communication terminal according to the present embodiment may reference the security level information, for example, and may determine whether or not the wireless communication devices corresponding to the IDs can or should pair with the wireless communication terminal.

According to the pairing method in the fifth embodiment, the host terminal is automatically determined, whereby the user does not have to perform work to determine the host terminal beforehand.

Also, according to the pairing method in the fifth embodiment, the host terminal and guest terminals automatically determined as described above complete the pairing similar to the above-described embodiments. Thus, similar to the embodiments described above, the wireless communication terminals having completed pairing are enabled to perform near field wireless communication with the pairing method in the fifth embodiment as well.

[Schematic Configuration of Wireless Communication Terminal According to Embodiments of the Present Invention]

Figure 4:
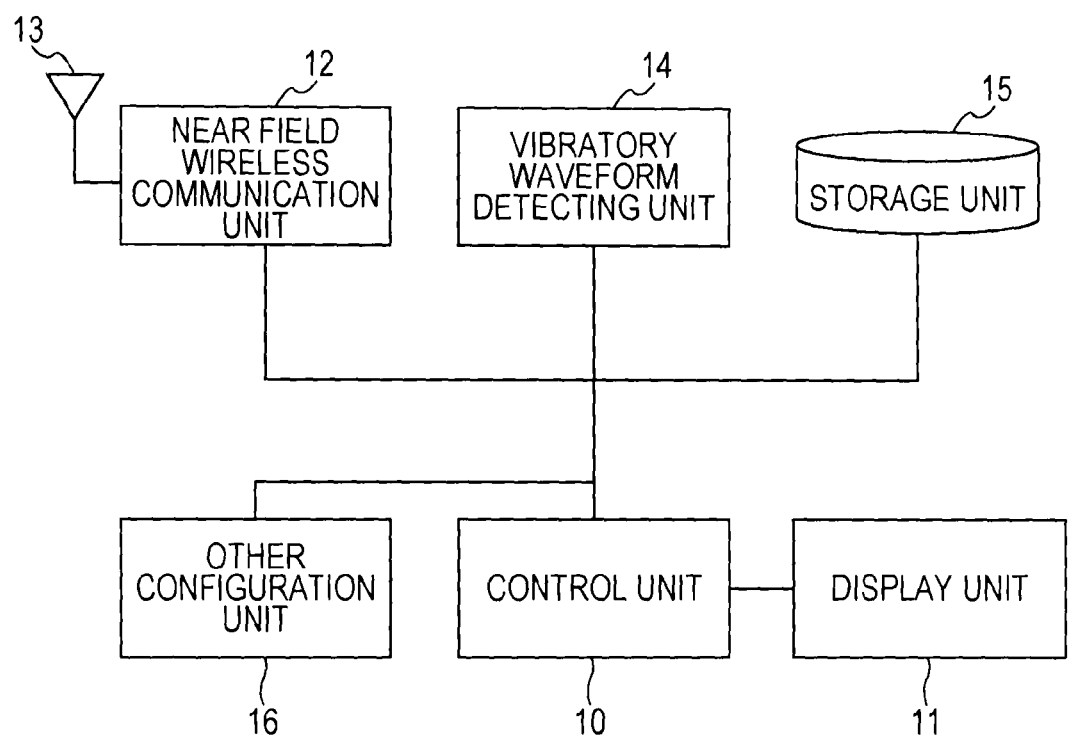
FIG. 4 is a block diagram illustrating a schematic configuration of primary portions of wireless communication terminals that can correspond to first through fifth embodiments according to the present invention.

FIG. 4 shows a schematic block diagram of the wireless communication terminal according to the first through fifth embodiments of the present invention described above. Note that FIG. 4 only shows the primary portions of the configuration relating to the embodiment of the present invention. That is to say, the wireless communication terminals of the present embodiment have various types of components that a general-use wireless communication terminal has, but these are omitted in the diagram in FIG. 4.

In FIG. 4, the near field wireless communication unit 12 has an antenna 13 for near field wireless communication, and performs wireless LAN communication such as WiFi (registered trademark) or near field wireless communication such as Bluetooth (registered trademark).

An vibratory waveform detecting unit 14 detects waveforms of physical vibrations that occur due to vibrations from a user tapping or vibrations from a vibrator and so forth that are transmitted via a casing or the like of other terminals, and the frequency of such vibrations, size of the vibratory waveforms (vibration level), and so forth. The vibratory waveform data detected by the vibratory waveform detecting unit 14 is sent to a later-described control unit 10, and is stored temporarily in a storage unit 15. Note that in the case of the present embodiment, the vibratory waveform detecting unit 14 has an accelerometer (acceleration sensor), gyroscope, or compass sensor, or a configuration having combination of these, and detects physical vibratory waveforms with this configuration.

A storage unit 15 includes not only internal memory of the terminal herein but also external memory. Internal memory is made up of ROM and RAM, and the ROM is a re-writable ROM. The re-writable ROM stores various types of application programs and so forth including programs such as an OS (operating system) and device drivers, an ID for its own terminal, version information, various types of initial setting values, and pairing control application programs relating to the present invention. Also, the rewritable ROM can store various types of information such as the access point list information and IDs and so forth used in such list. The RAM has a work region in the event that the later-described control unit 10 performs various types of data processing, as a buffer region to temporarily store data. Also, the RAM temporarily stores the vibratory waveform data detected by the vibratory waveform detecting unit 14, and is also used as temporary memory that temporarily stores the one-time reference data or one-time key data used in the event of pairing. Additionally, various types of data handled by the wireless communication terminals is stored in the storage unit 15. For example, in the case that the wireless communication terminal of the present embodiment is a cellular phone, various types of data used by the cellular phone such as data such as phone books and email address book, email data, photographic image data and motion picture data and so forth are stored in the storage unit 15. Note that various types of application programs including various types of data stored in the storage unit 15 and the pairing control application program according to the present invention include not only those prepared beforehand in the factory, but these may also be obtained via wireless communication or external cable, or may be obtained from storage media such as external memory wherein such application programs are stored.

A display unit 11 is made up of a display panel such as a liquid crystal panel or organic EL (electroluminescent) panel or the like provided on the casing of the wireless communication terminal of the present embodiment and a display driving circuit for driving the display panel thereof. The display unit 11 displays images and text and so forth with an image signal supplied from the later-described control unit 10. In the case of the present embodiment, the display unit 11 can display the above-described access point list also, for example.

Other configuration unit 16 is a block including various types of configurations which wireless communication terminals normally have. For example, in the case that the wireless communication terminal is a cellular phone, the other configuration unit 16 is made up of a communication module for connecting to a cellular phone network, a microphone and speaker for talking/listening, buttons, key, and touch panel for the user to operate, digital broadcast reception module, external memory interface unit, GPS module, non-contact communication module, camera module, various types of sensor modules, battery module, and so forth. Note that in the case that a touch panel is provided as a user-operated interface, the touch panel thereof may be provided on the screen of the display unit 11 at approximately the same size as the screen size thereof.

The control unit 10 controls the operations of the components of the wireless communication terminal of the present embodiment, such as the above-mentioned near field wireless communication unit 12, vibratory waveform detecting unit 14, storage unit 15, display unit 11, other configuration unit 16, and the like, and further, performs various types of calculations as needed. Also, the control unit 10 starts up and executes various types of programs as needed, including the pairing control application program of the first through fifth embodiments of the present invention stored in the storage unit 15. Particularly in the case of the present embodiment, the control unit 10 after the pairing control application program has started can execute the processing in the steps in a later-described flowchart by execution of the pairing control application program.

[Processing Flow at time of Pairing Control Application Program Execution using Vibratory Waveform Detection]

Figure 5:
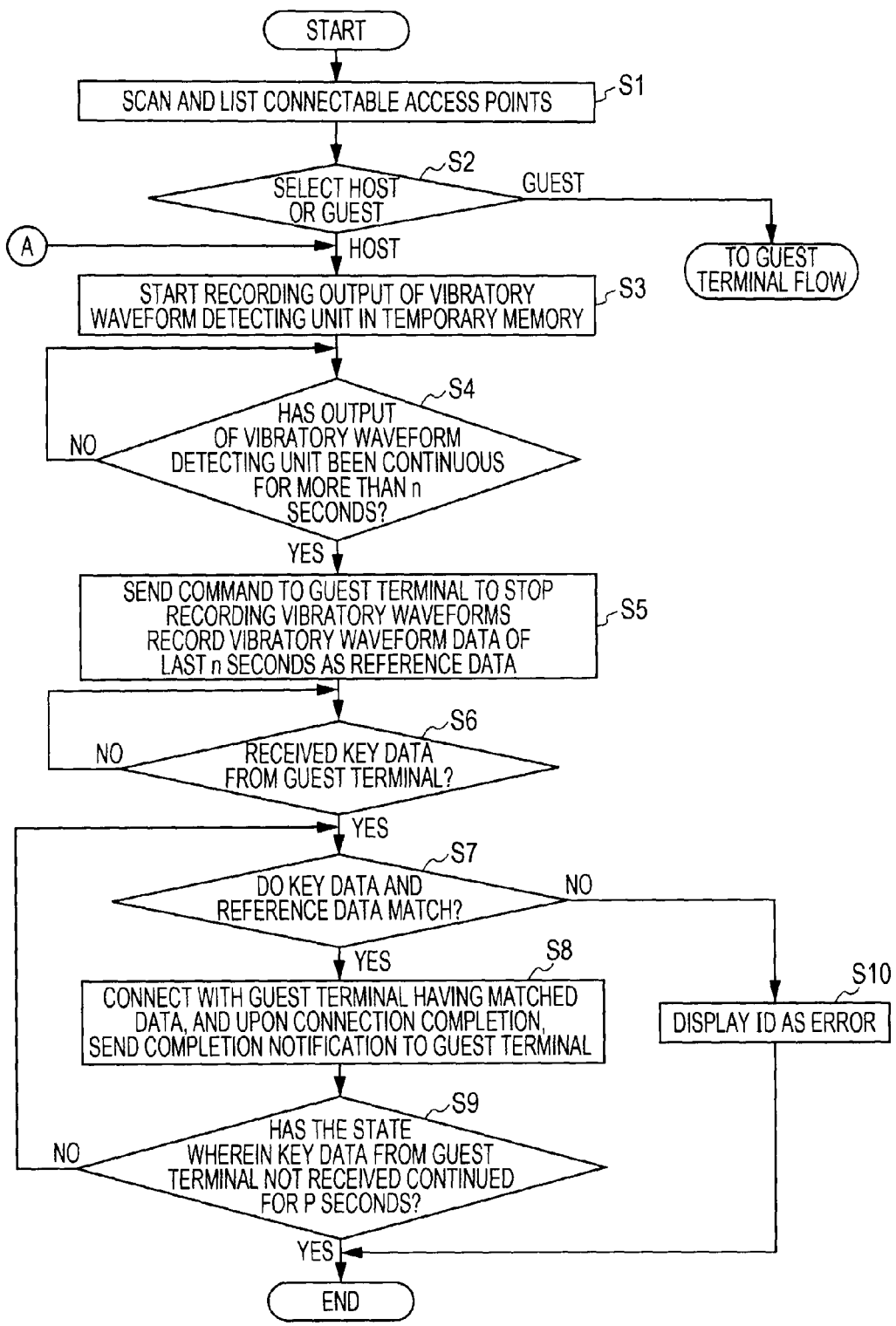
FIG. 5 is a flowchart describing the flow of pairing processing according to the first embodiment by a control unit in FIG. 4 executing a pairing control application program, and in particular showing the flow of the host terminal side processing.
Figure 6:
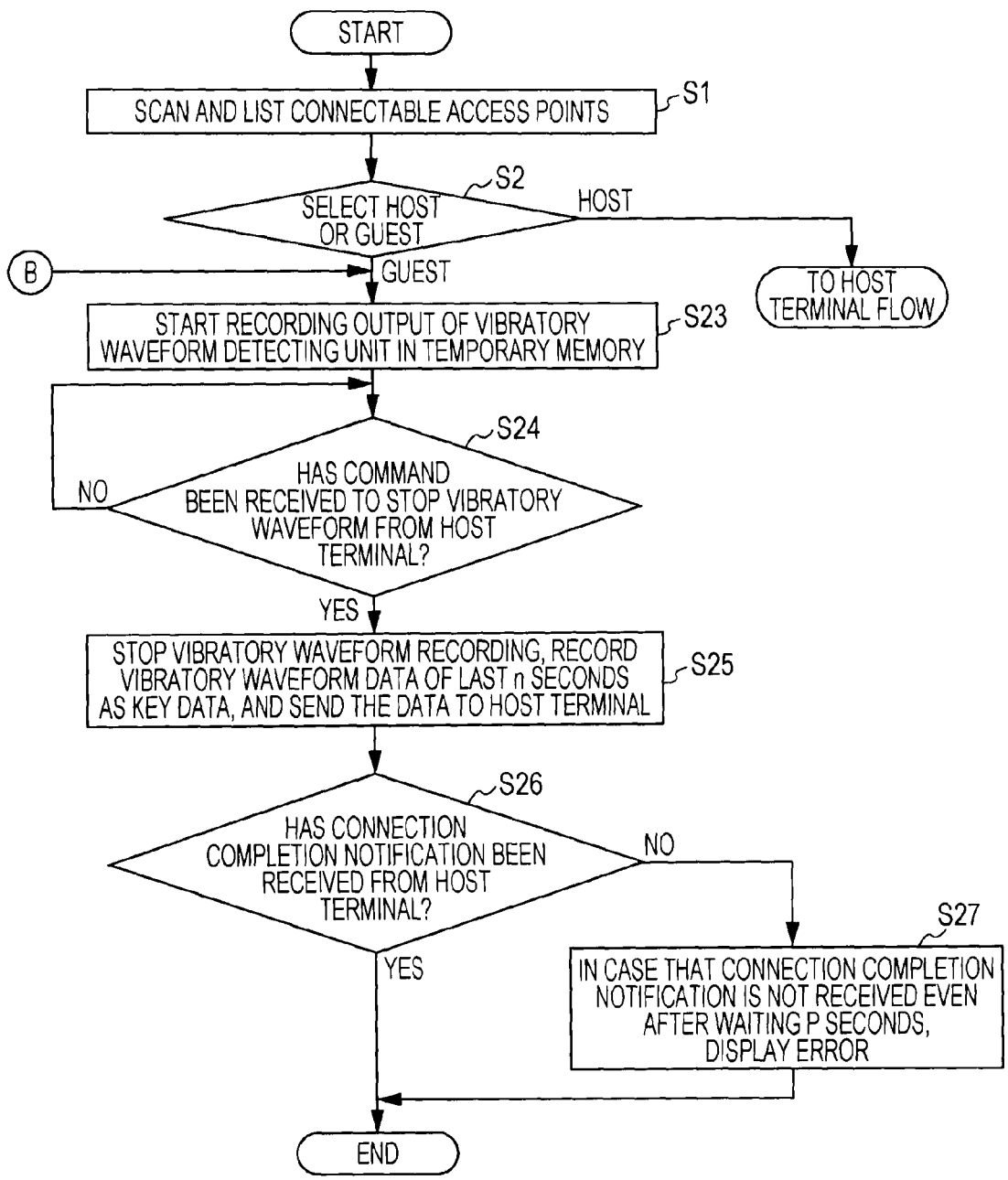
FIG. 6 is a flowchart describing the flow of pairing processing according to the first embodiment by a control unit in FIG. 4 executing a pairing control application program, and in particular showing the flow of the guest terminal side processing.
Figure 7:
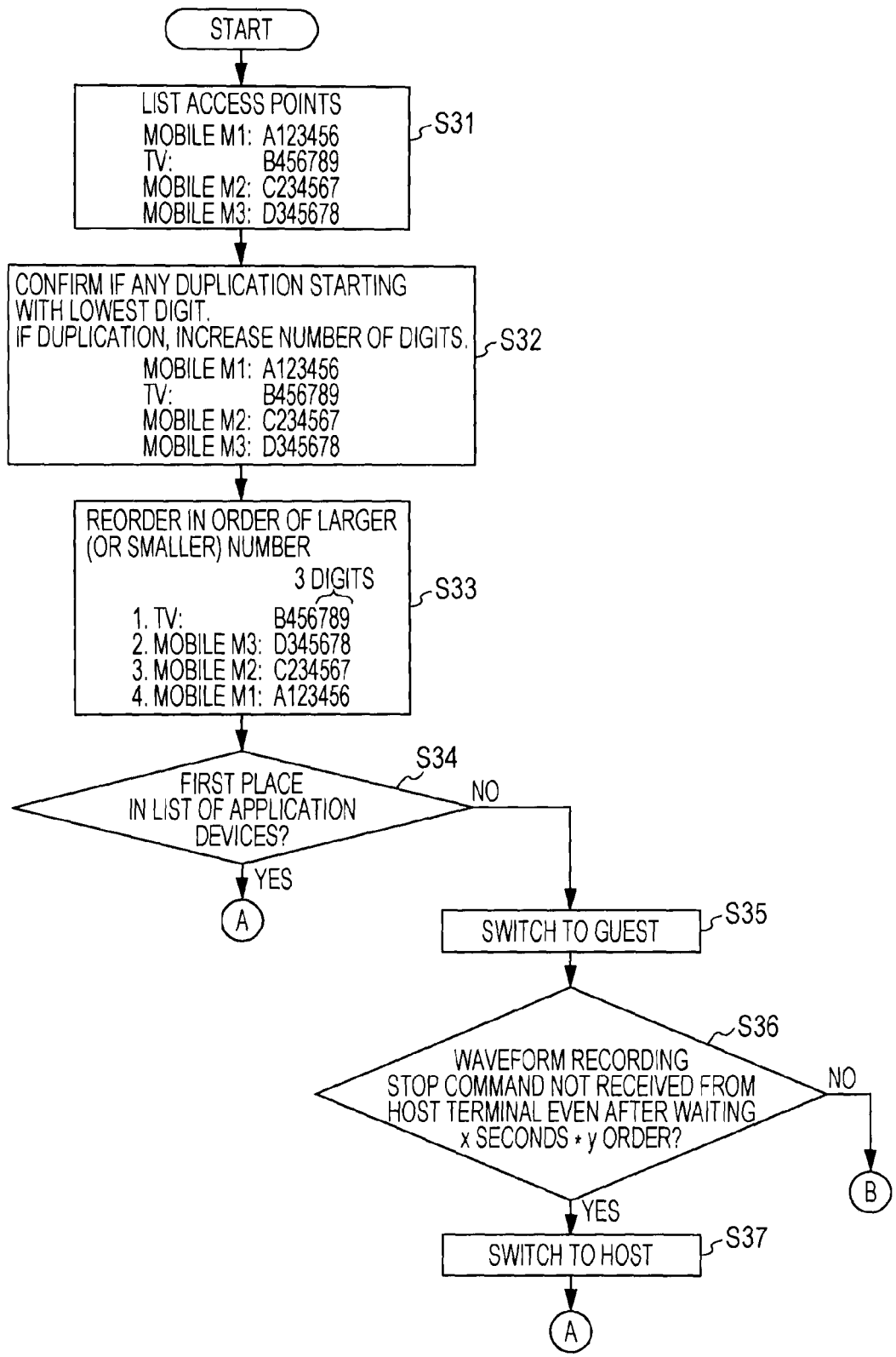
FIG. 7 is a flowchart describing the flow of pairing processing according to the first embodiment by a control unit in FIG. 4 executing a pairing control application program, and in particular showing the processing flow of the portion wherein the host terminal or guest terminal is automatically determined.
Figure 9:
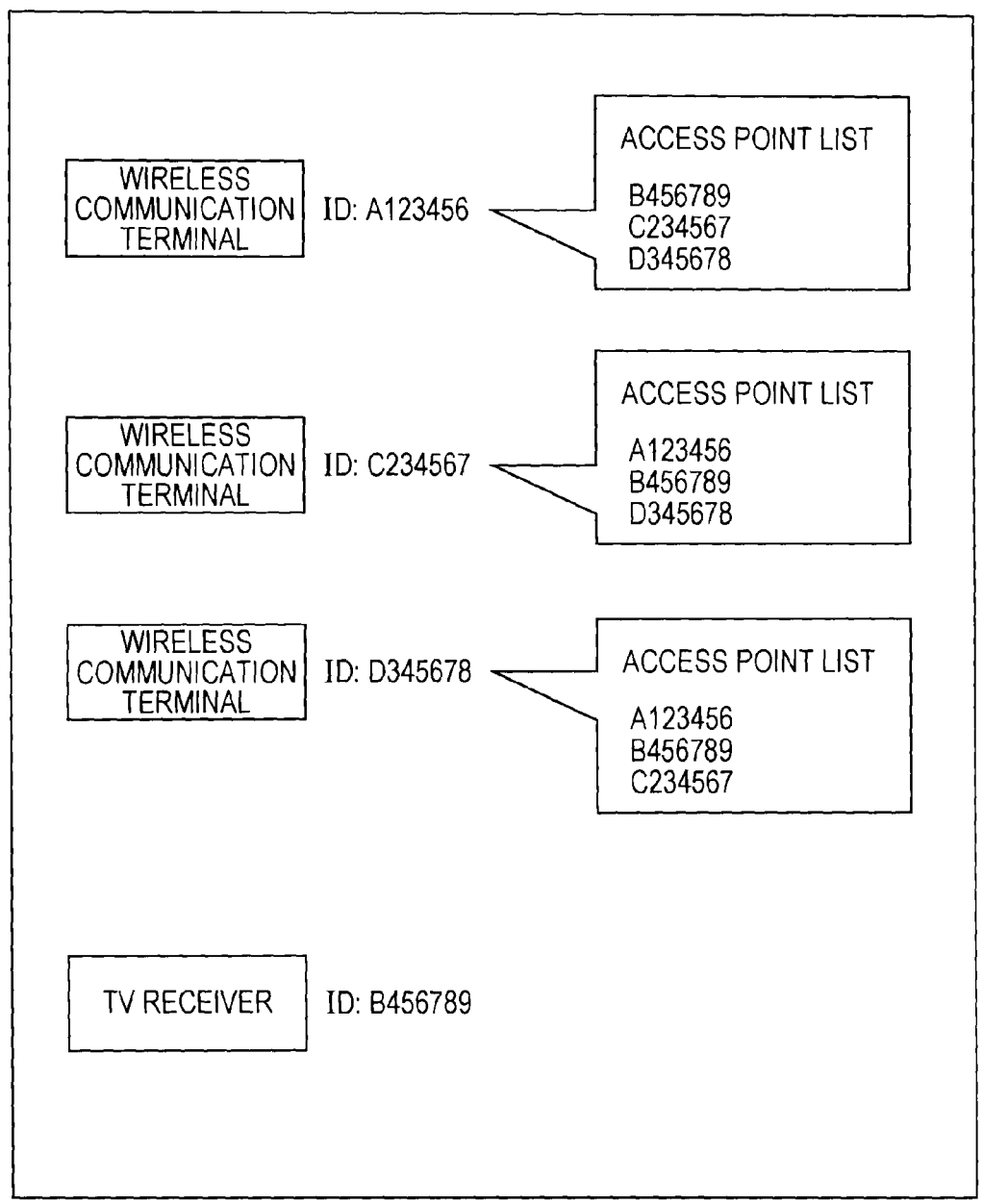
FIG. 9 is a diagram illustrating an example of an access point list generated with each wireless communication device before pairing with the near distance wireless communication according to a sixth embodiment.

FIGS. 5 through 7 show flowcharts of pairing processing performed as the control unit 10 executes the pairing control application program according to the embodiments of the present invention. Note that FIGS. 5 and 6 show flowcharts of the terminal selected by the user becoming the host terminal, the other terminals becoming the guest terminals, and the pairing processing of the host terminal and guest terminals thereof being completed, as in the first embodiment. Also, FIG. 7 shows a flowchart of wireless communication terminals becoming a host terminal or guest terminal based on the ID within the access point list or the ID of the terminal itself.

First, a series of processing flow from the selection of host terminal or guest terminal by the user to the completion of pairing of the terminals, as in the first embodiment of the present invention, will be described with reference to the flowcharts in FIGS. 5 and 6. Note that the flowcharts in FIGS. 5 and 6 show the processing flow in the case that, upon the pairing control application program of the present embodiment having started, the pairing mode of the near field wireless communication managed by this program is in a user-selection mode whereby the host terminal or guest terminal is selected by the user.

In FIG. 5 in the case that the pairing control application program of the present embodiment is started and the pairing mode is set to user-selection mode, the control unit 10 first scans all of the wireless communication devices existing within a region wherein near field wireless communication can be performed, by controlling the near field wireless communication unit 12, as the processing in step S1. The control unit 10 then generates an access point list including the IDs of all of the wireless communication terminals obtained by the scan. Also, the control unit 10 displays the access point list on the screen of the display unit 11 as needed. After the processing in step S1, the control unit 10 advances the processing to step S2.

Upon advancing the processing to step S2, the control unit 10 determines whether or not selection instructions have been input from the user as to whether to select the terminal itself as a host terminal or guest terminal. Note that according to the present embodiment, the user interface for the user to select either the host terminal or guest terminal is not particularly restricted, and for example, selection by using a touch panel or keys or buttons, or selection via audio may be used. Also, other than the case of the host terminal and guest terminal being determined according to selection instructions from the user, an arrangement may be made wherein, when the instructions to select the host terminal are not input within a certain amount of time, the control unit 10 automatically determines the terminal itself to be a guest terminal. Conversely, an arrangement may be made wherein, when the instructions to select the guest terminal are not input within a certain amount of time, the control unit 10 automatically determines the terminal itself to be a host terminal. In the determination processing in step S2 herein, in the case that the host terminal is selected, the control unit 10 advances the processing to step S3, and in the case that the guest terminal is selected, the control unit 10 advances the processing to step S23 in FIG. 6.

Upon advancing to the processing in step S3, the control unit 10 starts the vibratory waveform detecting operation with the vibratory waveform detecting unit 14, and in the case that the vibratory waveform detecting unit 14 detects a vibratory waveform, stores the vibratory waveform data in a temporary memory in the storage unit 15.

Also, the control unit 10 at this time determines whether or not a detection output from the vibratory waveform detecting unit 14 has continued for a predetermined amount of time (n seconds), as the processing in step S4. In the determining processing in step S4, if determination is made that detection output from the vibratory waveform detecting unit 14 has continued for a predetermined amount of time, the control unit 10 advances the processing to step S5, note that in the case of the flowchart in FIG. 5, the control unit 10 continues the determining processing in step S4 until the detection output from the vibratory waveform detecting unit 14 has continued for a predetermined amount of time, but for example in the case that detection output has not continued more than a predetermined amount of time, even after the amount of time decided beforehand has passed, for example upon displaying an error message on the display unit 11 that vibratory waveform detection has failed, the processing in the flowchart may be ended. Alternatively, in the case that detection output has not continued more than a predetermined amount of time, even after the amount of time decided beforehand has passed, the control unit 10 may display a message on the display unit 11 to the user so as to apply vibrations to the host terminal for longer than the predetermined amount of time.

Upon advancing to the processing in step S5, the control unit 10 generates a command as to all of the terminals that are guest terminals out of the wireless communication terminals in the access point list, to request stopping of the vibratory waveform data recording, and transmits a stop request command to all of the guest terminals through the near field wireless communication unit 12. Also, the control unit 10 at this time stores the vibratory waveform data going back the last n seconds worth of vibratory waveform data, i.e. n seconds worth before from the point in time of transmitting the stop request command, out of the vibratory waveform data that the vibratory waveform detecting unit 14 has detected and stored in the temporary memory, in the storage unit 15 as the one-time reference data. After the processing in step S5, the control unit 10 advances the processing to step S6.

Upon advancing to the processing in step S6, the control unit 10 determines whether or not the one-time key data has been received from one of the guest terminals to which the stop request command has been sent, through the near field wireless communication unit 12. In the determining processing in step S6, in the case determination is made that one-time key data has been received from one of the guest terminals, the control unit 10 advances the processing to step S7. Note that in the case of the flowchart in FIG. 5, the determining processing in step S6 is continued until key data is received from one of the guest terminals, but for example in the case that the one-time key data is not received even after a predetermined certain amount of time has passed, an error message indicating key data reception failure is displayed on the display unit 11, after which the processing in the flowchart may be ended. Alternatively, in the case that the one-time key data is not received from any of the guest terminals even after a predetermined certain amount of time has passed, the control unit 10 may continue the processing to transmit the command which requests key data transmission to the guest terminals, for example a predetermined number of times at predetermined intervals, and in the case that key data is not transmitted even after the command transmission processing for the predetermined number of times, the flowchart processing may be ended after displaying an error message indicating the key data reception failure.

Upon advancing to the processing in step S7, the control unit 10 determines whether or not the received one-time key data and the one-time reference data match, and in the case that the data do not match, the ID of the terminal having transmitted the one-time key data along with the error message is displayed on the screen of the display unit 11, as the processing in step S10. On the other hand, in the case that the one-time key data and one-time reference data match, the control unit 10 advances the processing to step S8.

Upon advancing to the processing in step S8, the control unit 10 performs settings for the pairing as to the near field wireless communication unit 12, and executes pairing as to the guest terminal having transmitted the one-time key data which matches with the one-time reference data. Upon completing the pairing, the control unit 10 transmits a pairing complete notification to the guest terminal thereof through the near field wireless communication unit 12. Upon the processing in step S8 ending, the control unit advances the processing to step S9.

Upon advancing to the processing in step S8, the control unit 10 confirms whether or not other guest terminals exist, excluding the guest terminal having completed the pairing, and in the case another guest terminal exists, determination is made as to whether or not a predetermined certain amount of time (P seconds) has passed in the state that one-time key data is not received from the guest terminal thereof, and in the case that time has not passed, the processing is returned to step S7. On the other hand, in the case that the certain amount of time (P seconds) has passed in the state that one-time key data is not received, the control unit 10 ends the processing of the flowchart, without performing pairing with the guest terminal thereof.

FIG. 6 shows the processing on the guest terminal side. Note that in the flowchart in FIG. 6, steps S1 and S2 are the same as in the corresponding steps in FIG. 5.

By the guest terminal being selected in step S2 in FIG. 6, the processing is advanced to step S23, whereby the control unit 10 starts the vibratory waveform detecting operation by the vibratory waveform detecting unit 14, and in the case that the vibratory waveform is detected by the vibratory waveform detecting unit 14, the vibratory waveform data thereof is stored in the temporary memory of the storage unit 15.

Next, the control unit 10 determines whether or not a command to request has been transmitted through the near field wireless communication unit 12 to stop the vibratory waveform recording from the host terminal side, as the processing in step S24. In the determining processing in step S24, the control unit 10 continues to record the vibratory waveform data while the stop request command has not been received, and on the other hand in the case that the stop request command has been received, the processing is advanced to step S25. Note that in the case of the flowchart in FIG. 6, the control unit 10 continues to record the vibratory waveform data until the stop request command is been received, but in the case wherein the stop request command is not transmitted even after the predetermined amount of time has passed, a message indicating that the vibratory waveform recording is to be stopped is displayed on the display unit 11, after which the processing in the flowchart herein may be ended.

Upon advancing to the processing in step S25 by receiving the stop request command, the control unit 10 stops the recording of the vibratory waveform data, and of the vibratory waveform data stored in the temporary memory of the storage unit 15, stores the vibratory waveform data from the last n seconds worth of vibratory waveform data, i.e., going back n seconds worth before from the point in time of receiving the stop request command, in the storage unit 15 as one-time key data. The control unit 10 then transmits the one-time key data to the host terminal through the near field wireless communication unit 12. After the processing in step S25, the control unit 10 advances the processing to step S26.

Upon advancing to the processing in step S26, the control unit 10 determines whether or not the pairing complete notification has been received from the host terminal through the near field wireless communication unit 12. In the case that the pairing complete notification has been received, the control unit 10 considers the pairing to be complete, and ends the processing in the flowchart herein.

On the other hand, in the case the pairing complete notification has not been received, the control unit 10 advances the processing to step S27, waits for a certain amount of time (R seconds), and in the case that a pairing complete notification is not received even after the certain amount of time has passed, displays an error message indicating pairing failure on the display unit 11, and ends the processing in the flowchart herein.

Next, the processing flow for the wireless communication terminal to become a host terminal themselves is described as in the fifth embodiment, based on access point list IDs and the ID of the terminals themselves. That is to say, the flowchart in FIG. 7 shows the processing flow in the case that the pairing mode of the near field wireless communication managed by the program is in automatic selection mode, wherein, upon starting the pairing control application program of the present embodiment, the terminal itself determines whether to be the host terminal or a guest terminal.

In FIG. 7, in the case that the pairing control application program of the present embodiment is started and the pairing mode is in automatic selection mode, the control unit 10 controls the near field wireless communication unit 12 to scan all of the wireless communication devices existing in an area where near field wireless communication can be performed, similar to step S1 described above, as the processing in step S31. The control unit 10 then generates an access point list including the IDs of all of the wireless communication terminal obtained by the scan. Also, the control unit 10 displays the access point list on the screen of the display unit 11 as needed. After the processing in step S31, the control unit 10 advances the processing to step S32.

Now, let us say that the category name of the various types of wireless communication devices and the IDs of each device therein are obtained as an access point list, as shown in FIG. 8. That is to say, the access point list shown in FIG. 8 may include, for example, a television receiver having an ID of "B456789", a printer having an ID of "E982443", a router having an ID of "F723332", a cellular phone having an ID of "A123456", a cellular phone having an ID of "C234566", a portable gaming device having an ID of "D345678", a stationary gaming device having an ID of "I236123", a PDA having an ID of "H235221", a digital camera having an ID of "J346112", a personal computer having an ID of "G123432", a portable gaming device having an ID of "K235156", and so forth.

In the case that an access point list exemplified in FIG. 8 has been generated, upon advancing to the processing in step S32 in FIG. 7, the control unit 10 compares the values of predetermined digits for each ID in the access point list with the ID of its own terminal, and checks whether or not there are two or more IDs having the same values for the predetermined digits.

According to the present embodiment, for each ID of the access point list, as an example, first the value of the lowest digits is compared, and checked whether or not there are two or more IDs having the same values for the lowest digit. In the case there are two or more IDs having the same values for the lowest digit among the sorted IDs, the control unit 10 increases the number of digits to be compared and compares each ID for the values in the lowest two digits, and checks whether or not there are ID having the same values for the lowest two digits. Similarly, the control unit 10 repeats the comparisons and one-digit increases until there are no IDs having the same values as the predetermined number of digits. In the case determination is made that there are no IDs having the same values for the predetermined number of digits, the control unit 10 advances the processing to step S33.

Note that in the example in step S32 in the flowchart in FIG. 7, IDs having the same values for the lowest three digits do not exist when the processing is advanced to the values for the lowest three digits. Also, with this example, value comparisons are started from the lowest side, but value comparisons may be performed from the highest side digits.

Upon advancing to the processing in step S33, the control unit 10 rearranges the IDs in the order of numerical values within the predetermined number of digits, for each ID having different values for the predetermined digits. According to the present embodiment, an example is given wherein the IDs are rearranged in the order of largest numerical values of the lowest three digits. After the sorting processing in step S33, the control unit 10 advances the processing to step S34. Note that in the example in step S33, the IDs are sorted in the order of largest numerical values for the predetermined digits, but the IDs may be sorted in the order of smallest numerical values.

Upon advancing to the processing in step S34, the control unit 10 makes determinations only for IDs from devices in a category and version that can correspond to the pairing control application program of the present embodiment, and that have the pairing control application program executing, and determines whether the ID corresponding to its own terminal is first place among the numerical values for the predetermined digits. That is to say, in the case of the present embodiment, of the sorted IDs, only IDs of terminals wherein the pairing control application program of the present embodiment is executed and that belong to the same category as itself and correspond to the same version are considered, whereby determination is made as to whether the ID of its own terminal is first place among the numerical values for the predetermined digits.

Note that in the case of the example in the flowchart in FIG. 7, for example the terminal itself having ID "A123456" belongs to the category of portable wireless communication terminals, and on the other hand for example the television receiver having ID "B456789" belongs to the category of stationary devices, so the categories thereof differ. In this case the ID "B456789" is excluded from the determination process. Also, in the case of this example, let us say that the wireless communication terminals corresponding to the remaining IDs "A123456", C2345667", and "D345678" have the version corresponding to the pairing control of the present embodiment, and execute the pairing control application program of the present embodiment. Accordingly, in the case of the example in FIG. 7, determination is made as to where among the IDs "A123456", C2345667", and "D345678" will the terminal itself having the ID "A123456" be in first place among the numerical values for the lowest three digits.

In the determining processing in step S34, in the case determination is made that the ID of its own terminal is first place among the numerical values for the predetermined number of digits, the control unit 10 sets its own terminal as the host terminal, and advances the processing to step S3 and beyond in FIG. 5.

On the other hand, in the case determination is made that the ID of its own terminal is not first place among the numerical values for the predetermined number of digits, the control unit 10 advances the processing to step S35, and sets its own terminal as a guest terminal.

Note that in the case of the flowchart in FIG. 7, the ID that is first place among the numerical values for the lowest three digits among the IDs "A123456", C2345667", and "D345678" is the ID "D345678", and its own terminal ID of "A123456" is not first place, whereby its own terminal is set to be a guest terminal. After the processing in step S35, the control unit 10 advances the processing to step S36.

Upon advancing to the processing in step S36, the control unit 10 waits for a predetermined amount of time corresponding to the order of its own terminal among the numerical values for the lowest three digits, for the command to request the host terminal to stop the vibratory waveform recording.

In the case of the flowchart in FIG. 7, the own terminal having ID "A123456" is in third place among the numerical values for the lowest three digits, whereby the terminal waits for the command from the host terminal to stop the vibratory waveform recording for an amount of time wherein "3", which is the order of the terminal, is multiplied by the predetermined amount of time (x seconds), i.e. (x seconds×3).

In the determining processing in step S36, in the case that the stop request command is transmitted from the host terminal side before the predetermined amount of time has passed, the control unit 10 advances the processing to step S23 in FIG. 6.

On the other hand, in the case that the stop request command is not transmitted from the host terminal side even after the predetermined amount of time has passed, the control unit 10 advances the processing to step S37, sets its own terminal as the host terminal, and advances the processing to step S3 and beyond in FIG. 5.

[Pairing Method of Sixth Embodiment]

With the pairing method according to the first through fifth embodiments described above, an example is given wherein pairing is performed by transmitting the physical vibrations generated by the user or the wireless communication terminal itself to other wireless communication terminals via a vibratory medium such as the casings of the other terminals or a table or the like. According to the present invention, the physical vibrations may be vibratory waveforms in the case that the air is the vibratory waveform medium (audio vibratory waveform), as in the pairing method according to a sixth embodiment below.

The sixth embodiment shows a method to pair the wireless communication terminals using audio vibratory waveforms by physically vibrating the air as the vibratory waveform medium.

According to the pairing method of the sixth embodiment, when the multiple wireless communication terminals are in the state of starting the pairing control application program before starting the near field wireless communication between the terminals, an access point list is generated, similar to that described above.

Also, in the case of the pairing method of the sixth embodiment, the multiple wireless communication terminals are disposed at a distance such that audio transmittance can be made. That is to say, the multiple wireless communication terminals are disposed in near field range wherein audio vibrations by a predetermined audio can be shared between terminals at approximately the same time.

Note that from a security perspective, the audio volume at this time should be at a volume at which only the wireless communication terminals desired for pairing can be reached, and at which other wireless communication terminals cannot be reached. In other words, in the case that the audio volume is set to be low from a security perspective, the wireless communication terminals to be paired are to be disposed within a range that the audio at this volume can reach. It goes without saying that, according to the present embodiment, the wireless communication terminals to be paired may be stacked together as described above, or disposed in a state wherein a portion of the casings are in contact, and so forth. Also, the pairing method of transmittance of audio vibratory waveforms of the present embodiment and a pairing method of physical vibratory transmittance of a casing or the like of the first through fifth embodiment may be combined.

Also, similar to the descriptions above, with the pairing method according to the present embodiment, a terminal to be the host in the event of pairing is determined from among the multiple wireless communication terminals disposed at near distance wherein the audio vibrations can be shared between each terminal.

In the case of the sixth embodiment, which of the multiple wireless communication terminals becomes the host terminal is determined according to selection instructions by the user, for example. That is to say, for example, a terminal having instructions input from the user to become the host terminal becomes the host terminal, and the other terminals become the guest terminals. The timing to determine the host terminal may be before disposing the terminals near each other as described above, or may be at any timing after being disposed near each other. Also, with the present embodiment, the relative position relation between the host terminal and guest terminals are not particularly restricted, but for example a spatial relation is desired whereby the speaker of the host terminal and the microphone of the guest terminal can correspond, i.e. a spatial disposal whereby the audio output from the speaker of the host terminal can easily be input in the microphone of the guest terminal, is desired.

Now, according to the present embodiment, for example as shown in FIGS. 9 through 12, let us say that the wireless communication terminal having ID "A123456" generates an access point list including the IDs of "B456789", "C234567", and "D345678". Also, let us say that the wireless communication terminal having the ID "C234567" generates an access point list including the IDs of "A123456", "B456789", and "D345678". Similarly, let us say that the wireless communication terminal having the ID "D345678" generates an access point list including the IDs of "A123456", "B456789", and "C234567". Also let us say that in FIGS. 9 through 12, the host terminal selected by the user is the wireless communication terminal having ID "B456789". Note that in the example in FIGS. 9 through 12, for example the ID "B456789" is a television receiver, so from the perspective of the wireless communication terminals according to the present embodiment, cannot be a pairing candidate.

Figure 10:
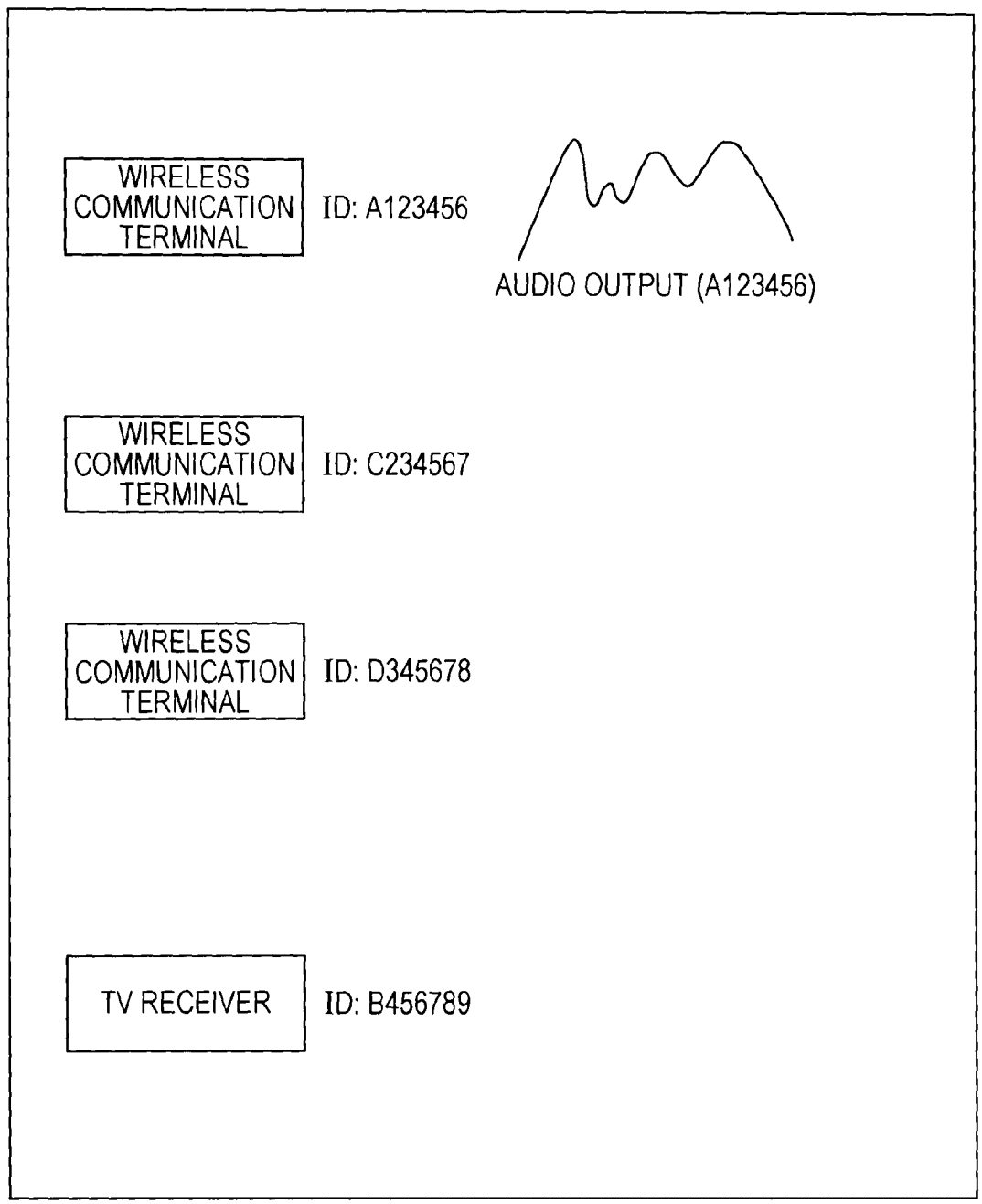
FIG. 10 is a diagram to describe a situation in the sixth embodiment wherein a host sound based on an ID from a host terminal is output in the event of near field wireless communication pairing.

According to the sixth embodiment, the wireless communication terminal having determined to be the host terminal by instructions from the user first outputs a predetermined audio from an internal speaker that is for notifying that the terminal itself is to be the host terminal (hereinafter called host sound), as shown in FIG. 10.

Note that according to the present embodiment, the audio that notifies that the terminal itself is the host terminal (host sound) is audio wherein the terminal ID thereof "A123456" is converted into an audio scale, as an example. More specifically, it is desirable for the host sound to be audio that the device having the microphone can mechanically recognize, such as audio converted by a so-called DTMF (Dual-Tone Multi-Frequency) method. According to the present embodiment, an example is given using audio with the DTMF method wherein mechanical recognition is easily made, but it goes without saying that other various types of data and audio conversion methods may be used.

Figure 11:
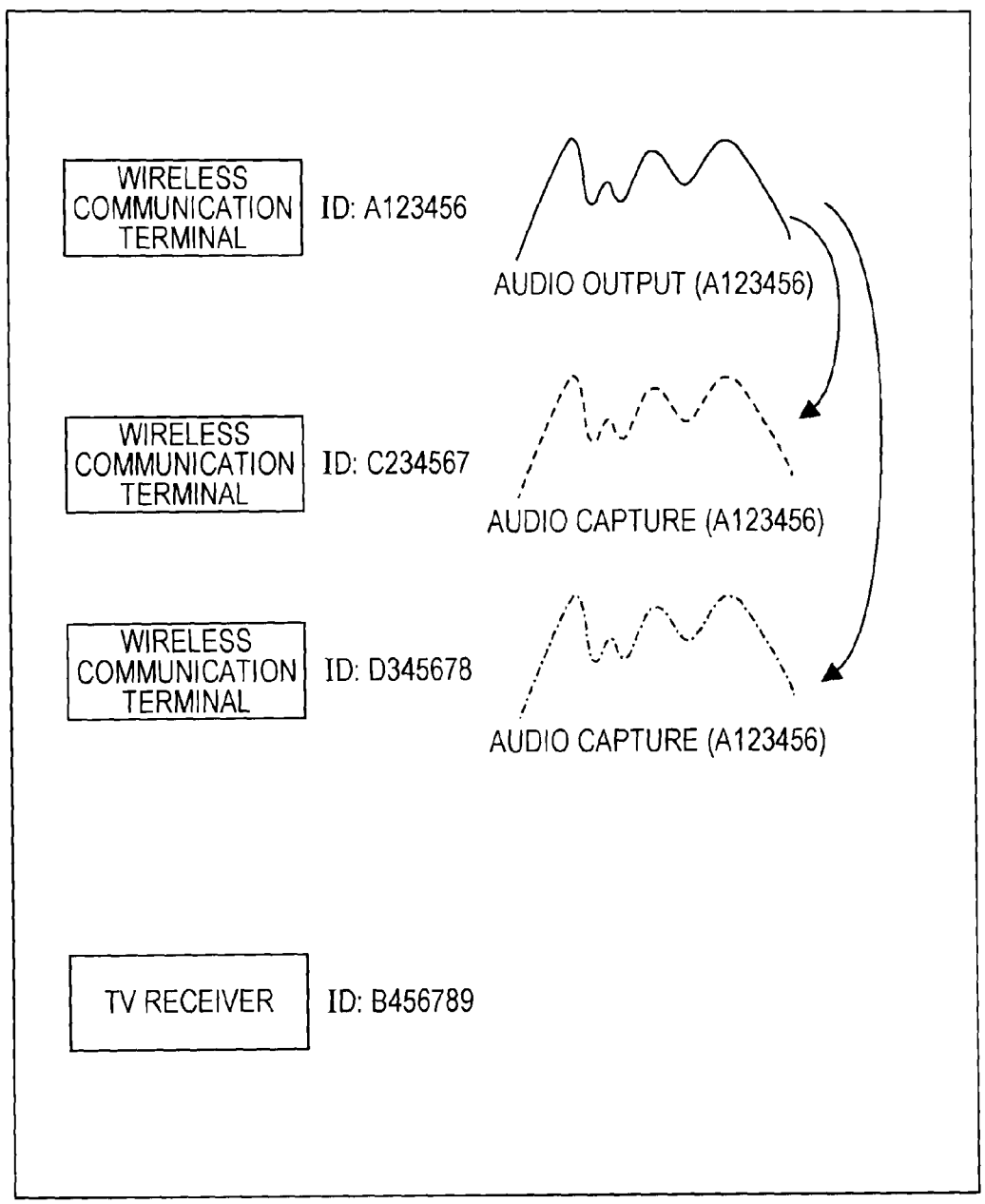
FIG. 11 is a diagram to describe a situation in the sixth embodiment wherein audio vibratory waves of the host sound output from a host terminal in the event of near field wireless communication pairing is transferred to each guest terminal.

Thus, as shown in FIG. 11, the host sound that the host terminal generates and outputs from the speaker is transmitted to the other wireless communication terminals, i.e. the air vibrations by audio waves of the host sound are transmitted to the other wireless communication terminals.

On the other hand, the other wireless communication terminals having received the host sound which the host terminal outputs from the speaker, each with internal microphones, each become the guest terminal.

The guest terminals restore the ID "A123456" from the DTMF audio data of the host sound, and temporarily store the ID thereof, each in an internal memory. That is to say, in the case of the pairing method of the sixth embodiment, the guest terminal temporarily stores the ID restored from the host sound which is transmitted from the host terminal side via the air which is the vibrating waveform medium, as one-time key data.

Figure 12:
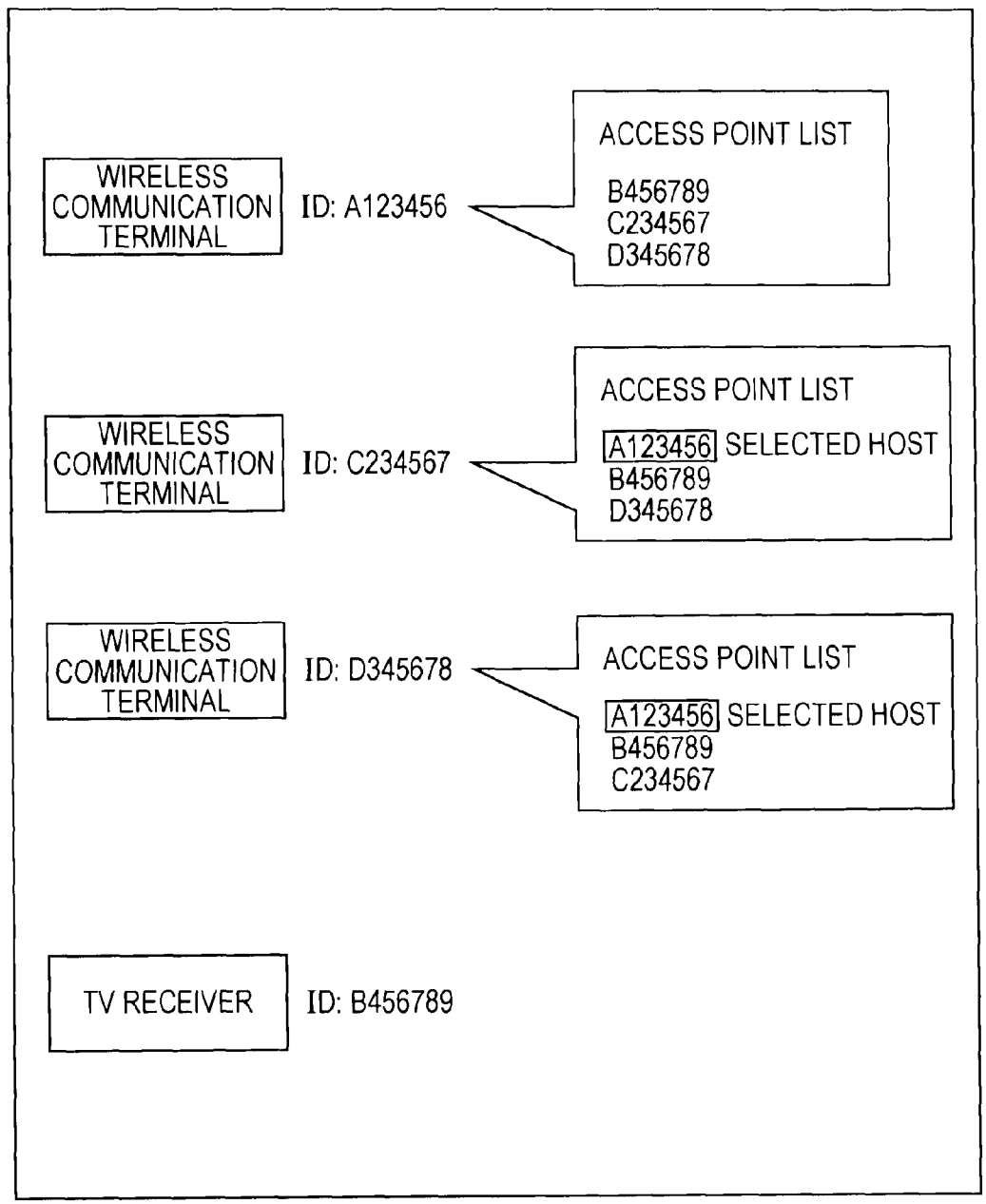
FIG. 12 is a diagram to describe a situation in the sixth embodiment wherein pairing is completed based on the ID restored from the host sound of the host terminal in the event of near field wireless communication pairing.

Next, as shown in FIG. 12, the guest terminals determine whether or not the ID "A123456" restored from the host sound exists in the access point list generated beforehand by the terminal itself. In the case that the ID "A123456" exists in the access point list, the guest terminals recognize the wireless communication terminal corresponding to the ID "A123456" as the host terminal.

That is to say, in the case of the sixth embodiment, the guest terminals use the IDs in the access point list generated beforehand as one-time reference data, and recognize the wireless communication terminal corresponding to an ID that matches the ID of the one-time key data restored from the host sound as the host terminal.

Subsequently, with the pairing method of the sixth embodiment, pairing is performed between the host terminal and the guest terminal.

Thus, according to the pairing method of the sixth embodiment of the present invention, the wireless communication terminals compare the ID information shared through the audio transmission, thereby enabling near field wireless communication between the wireless communication terminals.

Also, according to the pairing method of the sixth embodiment, pairing is enabled only between wireless communication terminals within a near-field range capable of audio transmittance, and pairing is not performed between wireless communication terminals that exist at a distance such that audio cannot be transmitted, whereby the user will not pair terminals in error unintentionally.

[Pairing Method of Seventh Embodiment]

With the pairing method according to the sixth embodiment described above, an example is given wherein pairing is performed by converting the ID of the host terminal into audio (host sound) and transmitting, and using the host terminal ID restored from the host sound thereof. According to the present invention, the audio data of the host sound generated from the host terminal ID may be used without change, as the one-time reference data and one-time key data, as in the pairing method according to a seventh embodiment below.

That is to say, in the case of the pairing method according to the seventh embodiment, the host terminal outputs a host sound based on the DTMF audio data generated from the ID "A123456" of its own terminal, and stores the DTMF audio data of the host sound in an internal memory as one-time reference data, without change. Note that in the case of the seventh embodiment, the host sound generated from the above-mentioned ID may be generated using the above-mentioned DTMF method, or may be generated using another method.

Also, the wireless communication terminal having received the host sound that is output from the host terminal becomes the guest terminal, similar to the case of the sixth embodiment. The guest terminal temporarily stores the audio data of the host sound transmitted from the host terminal, as one-time key data, without change.

Next, the guest terminal outputs the audio data made up of the temporarily stored one-time key data from the speaker as a guest sound and transmits this to the host terminal.

After output of the host sound, the host terminal having received the guest sound transmitted from the other terminals compares the audio data of the guest sound, i.e. the one-time key data, and the one-time reference data stored internally beforehand.

When the one-time reference data and one-time key data match, the host terminal performs pairing with the guest terminal thereof.

Thus, according to the pairing method of the seventh embodiment, mutual near field wireless communication is enabled for both the host terminal and guest terminals.

Note that in the case of the seventh embodiment, in the event of comparing the one-time reference data and one-time key data, it is desirable to have a certain comparison margin. That is to say, the audio propagated through the air is not only directly transmitted between terminals via the air as a medium, but for example the audio may arrive after reflecting against a wall or the like, whereby a certain amount of error may have occurred between the audio output by the host terminal and the audio returned from the guest terminal after detection by the guest terminal.

Also, according to the seventh embodiment, the audio volume and disposal of the terminals can be similar to that described in the sixth embodiment.

According to the pairing method of the seventh embodiment, the wireless communication terminals compare the audio data shared through audio transmittance and complete the pairings, enabling near field wireless communication between the wireless communication terminals thereof.

Also, according to the pairing method of the seventh embodiment, similar to the case of the sixth embodiment, pairings can be made only between wireless communication terminals within a near field range where audio can be transmitted, and pairings are not made between wireless communication terminals existing at a distance where audio cannot reach, whereby the user does not perform pairings in error between unintended terminals.

[Pairing Method of Eighth Embodiment]

According to the pairing method of the sixth and seventh embodiments, an example is given wherein the host terminal outputs audio, but as a pairing method according to an eighth embodiment of the present invention, the audio used in the event of pairing may be audio that the user has uttered, for example, or audio that a separately prepared audio output device has emitted.

According to the eighth embodiment, the host terminal and guest terminals are determined by selection by the user, for example, similar to descriptions above.

Upon taking in the audio uttered by the user or the audio output by the audio output device via an internal microphone, for example, the host terminal of the present embodiment temporarily stores the audio data taken in to an internal memory as one-time reference data.

Also, upon taking in the audio uttered by the user or the audio output by the audio output device via an internal microphone, the guest terminal temporarily stores the audio data taken in to an internal memory as one-time key data. Next, the guest terminal outputs the audio generated based on the temporarily stored one-time key data from the speaker, and transmits this to the host terminal.

Upon temporarily storing the one-time reference data, the host terminal takes in the audio output from the guest terminal with the microphone, thereby handling the audio data taken in as one-time key data from the guest terminal, and compares the one-time key data with the one-time reference data. When the one-time key data and one-time reference match, the host terminal pairs with the guest terminal thereof.

Thus, with the pairing method of the eighth embodiment also, near field wireless communication is mutually enabled between the host terminal and guest terminal.

Note that because of a reason similar to the case in the seventh embodiment, it is desirable to hold a certain comparison margin in the event of comparing the one-time reference data and one-time key data in the case of the eighth embodiment also. Also, with the eighth embodiment, audio volume and disposal of terminals may be similar to that described in the sixth embodiment.

According to the pairing method of the eighth embodiment, the wireless communication terminals share the audio uttered by the user or the audio data output by a separate audio output device, and by comparing the audio data therein and completing the pairing, enable the near field wireless communication between the wireless communication terminals.

Also, according to the pairing method of the eighth embodiment, similar to the sixth and seventh embodiments, pairings are made only between wireless communication terminals that are within a near field range wherein audio transmittance can be enabled, and pairing is not performed between wireless communication terminals existing at a distance, whereby the user does not perform pairings in error between unintended terminals.

[Pairing Method of Ninth Embodiment]

With the pairing method according to the sixth through eighth embodiment described above, examples are given wherein the user selects and determines the host terminal, but according to the present invention, the host terminal may be automatically determined from wireless communication terminals that can share audio between terminals, as in the pairing method according to the ninth embodiment described below.

According to the pairing method of the ninth embodiment, determination is made as to whether the multiple wireless communication terminals, which are in a state of being disposed near one another so as to be able to each share audio, become the host terminal or a guest terminal based on the information in the access point list, similar to the case of the fifth embodiment described above, and each of the wireless communication terminals determines itself to be either the host terminal or a guest terminal.

Now, with the pairing method of the ninth embodiment, similar to that described in the fifth embodiment, an ID in the access point list is referenced, for example, and the terminal that is in first place in an ascending order or descending order for example determines itself to be the host terminal, and the other terminals determine themselves to be guest terminals. Additionally, each terminal can determine whether to be the host terminal or a guest terminal, for example using the numerical order of the ASCII codes corresponding to each ID or an ascending/descending order based on a common constant for each terminal such as date and time information (earliest or latest date and time).

Note that similar to the case in the fifth embodiment, in the event of referencing the IDs, determination is made as to whether the ID is in first place in ascending order or descending order, using only the information of a predetermined number of low-order digits or a predetermined number of high-order digits or a predetermined number of mid-order digits of each ID. Also, in the case that there are two or more IDs wherein the information of the predetermined number of digits is the same, similar to the above description, the number of digits is increased by one digit to create new predetermined number of digits information, and this process is repeated until there is only one ID having the same predetermined number of digits information.

Also, similar to the case of the fifth embodiment, in the event of referencing the IDs, the wireless communication terminal of the ninth embodiment determines whether or not the other wireless communication devices corresponding to the IDs in the access point list can be pairing candidates, by referencing category information in the access point list, version information, wave level information, and so forth. The wireless communication terminals according to the present embodiment reference only the IDs corresponding to terminals that have been determined to be pairing candidates, and each determines whether itself will be the host terminal or a guest terminal.

With the pairing method of the ninth embodiment, the host terminal and guest terminals thus determined automatically complete the pairings, similar to one of the pairing methods in the sixth through eighth embodiments. Thus, with the pairing method of the ninth embodiment, similar to the embodiments described above, the wireless communication terminals having completed the pairings are enabled for near field wireless communication.

Also, with the pairing method of the ninth embodiment, the host terminal is automatically determined, whereby the user does not have to perform work to determine the host terminal.

[Pairing Method of Tenth Embodiment]

According to the present invention, as with the pairing method of a tenth embodiment described below, when two or more wireless communication terminals disposed near each other receive an external sound at approximately the same time which occurs by tapping or the like, the host terminal or guest terminals can be automatically determined based on the unique sound received by each of the terminals.

With the pairing method of the tenth embodiment, it is desirable for the external sound serving as a trigger (hereinafter called trigger sound) in the event that the wireless communication terminals emit a unique sound to be a sound that does not occur often in a normal audio environment, such as a tapping sound of tapping an item with a finger or the like. That is to say, for example in the case that the sound frequently occurs in a normal audio environment, the user can unintentionally start the pairing process of the present embodiment when the sound emitted coincidentally in the peripheral audio environment is received. However, if a sound that does not occur frequently in a normal audio environment such as the tapping sound is set as the trigger sound, starting the pairing process in error can be prevented.

Also, with the pairing method of the tenth embodiment, the sound that each wireless communication terminal uniquely emits may be, for example, audio of unique frequency that differs by each terminal, audio of unique pitch that differs by each terminal, audio of unique volume that differs by each terminal, audio of combinations of unique melodies that differ by each terminal, and unique audio that differs by each terminal which is generated based on the audio signals having transmittance information encoded according to predetermined encoding method.

An example of audio of unique frequency that differs by each terminal may be the audio of tone wherein the frequencies corresponding to the IDs of the wireless communication terminals emitting the sound serve as a base. That is to say, in the case that the lowest three digital of the wireless communication terminal ID is "123", for example, the audio of unique frequency of the terminal thereof is audio having a frequency of 1230 Hz. Thus, in the case that each wireless communication terminal emits audio having a unique frequency different from the other terminals, the terminal receiving the audio thereof restores the lowest three digits of the ID from the frequency of the received audio. Note that an example is giving here corresponding the numerical values of the ID directly to the frequency, but the frequency corresponding to the numerical values of the ID can also be set, and the frequency may be determined from the ID based on a correlation chart thereof. Additionally, with the above-described example, the lowest three digits of an ID are exemplified, but other digits may be used, and also, the frequency may be determined based on a value obtained by some sort of weighting as to the numerical values of the digits. Additionally, with the above example, the lowest three digits of the ID are exemplified, but other digits may be used, and the frequency may be determined based on values obtained by weighting as to the numerical values of each digit.

An example of audio of unique pitch that differs by each terminal may be the audio of pitch corresponding to the IDs of the wireless communication terminals emitting the sound, for example. As an example, in the case that the lower three digits of the ID of a wireless communication terminal is "123", as the audio of unique pitch of the terminal thereof can be, for example, audio of the scale "do, re, mi" made up of the sound of "do" corresponding to the numerical value "1" of the ID, the sound of "re" corresponding to the numerical value "2", and the sound of "mi" corresponding to the numerical value "3". Thus, in the case that the wireless communication terminals emit audio of unique pitch that differs by each terminal, the terminal receiving the audio restores the lower three digits of the ID from the pitch of the sound received. Note that an example is given here wherein the numerical value of an ID corresponds to a scale, but the correlation between the numerical value of an ID and the sounds of the scale can be set optionally, and the sound of each pitch can be determined from the ID based on the correlation chart thereof. Additionally, with the above example, the lowest three digits are exemplified, but other digits may be used, and the pitch may be determined based on values obtained by weighting as to the numerical values of each digit.

An example of audio of unique melody combination that differs by each terminal may be the audio of melody combination corresponding to the IDs of the wireless communication terminals emitting the sound, for example. As an example, in the case that the lower three digits of the ID of a wireless communication terminal is "123", as the audio of unique melody combination of the terminal thereof can be, for example, audio of the scale "melody 1, melody 2, melody 3" made up of "melody 1" corresponding to the numerical value "1" of the ID, "melody 2" corresponding to the numerical value "2", and "melody 3" corresponding to the numerical value "3". Note that melody 1, melody 2, and melody 3 are each different melodies. Thus, in the case that the wireless communication terminals emit audio of unique melody combination that differs by each terminal, the terminal receiving the audio restores the lower three digits of the ID from the melody combination of the sound received. Note that an example is given here wherein the numerical value of an ID corresponds to a predetermined melody, but the correlation between the numerical value of an ID and the melody corresponding to the numerical values of the ID can be set optionally, and the sound of each melody can be determined from the ID based on the correlation chart thereof. Additionally, digits other than the lowest three digits may be used instead of the lower three digits of the ID, and the melodies may be determined based on values obtained by weighting as to the numerical values of each digit.

An example of unique audio that differs by each terminal generated based on audio signals whereby transmittance information is encoded according to a predetermined encoding method may be audio which has applied the techniques disclosed in Japanese Unexamined Patent Application Publication No. 2003-186500, for example. As an example, in the case of using the lower three digits of the ID of a wireless communication terminal as transmittance information, the unique audio of the terminal thereof can be the audio based on the audio signal wherein the lower three digits of the ID are encoded according to a predetermined encoding method. Also, according to this example, the unique audio can have the lower three digits of the ID converted into an intermediate code according to a predetermined encoding method, and may be audio appending the music arrangement information to audio information based on the intermediate code thereof. Now, the intermediate code can set the height of the notes and length of the notes, for example. Also for example, in the case that the intermediate code is the height of the notes, the music arrangement information can be the length or tone of the notes. Also, in the case that the intermediate code is the length of notes, the melody, note height, and tone can be arranged optionally. With this arrangement, predetermined musical elements can be changed for a portion of an existing tune, whereby the lower three digits of the ID can be built in to the existing tune. Also, with this example, the intermediate code may have parameters of a so-called MIDI (Musical Instrument Digital Interface) format corresponded thereto. That it so say, the MIDI signal is made up of parameters such as note height, volume, note length, tone, and so forth, and the applicable parameters can be determined according to the intermediate code, based on which parameters the intermediate code is applicable to.

Also, with the pairing method of the tenth embodiment, determining the host terminal based on the emitting and receiving of unique audio is performed as described above based on the order of IDs of terminals, size order of the ASCII codes corresponding to the IDs, and ascending/descending order based on common constants for each terminal such as data and time information.

The pairing method of the tenth embodiment will be described in detail below with reference to FIGS. 13 through 16.

As shown in FIGS. 13 through 16, before the multiple wireless communication terminals start the near field wireless communication between the terminals thereof, upon the pairing control application program being in a started state, the access point list is similarly generated. Also, the multiple wireless communication terminals are disposed at a distance nearby so that the audio can be transmitted. That is to say, the multiple wireless communication terminals are disposed in a near field range whereby air vibrations from predetermined audio can be shared at approximately the same time between terminals. Note that the access point list is the same as that in the example in FIGS. 9 through 12.

Figure 13:
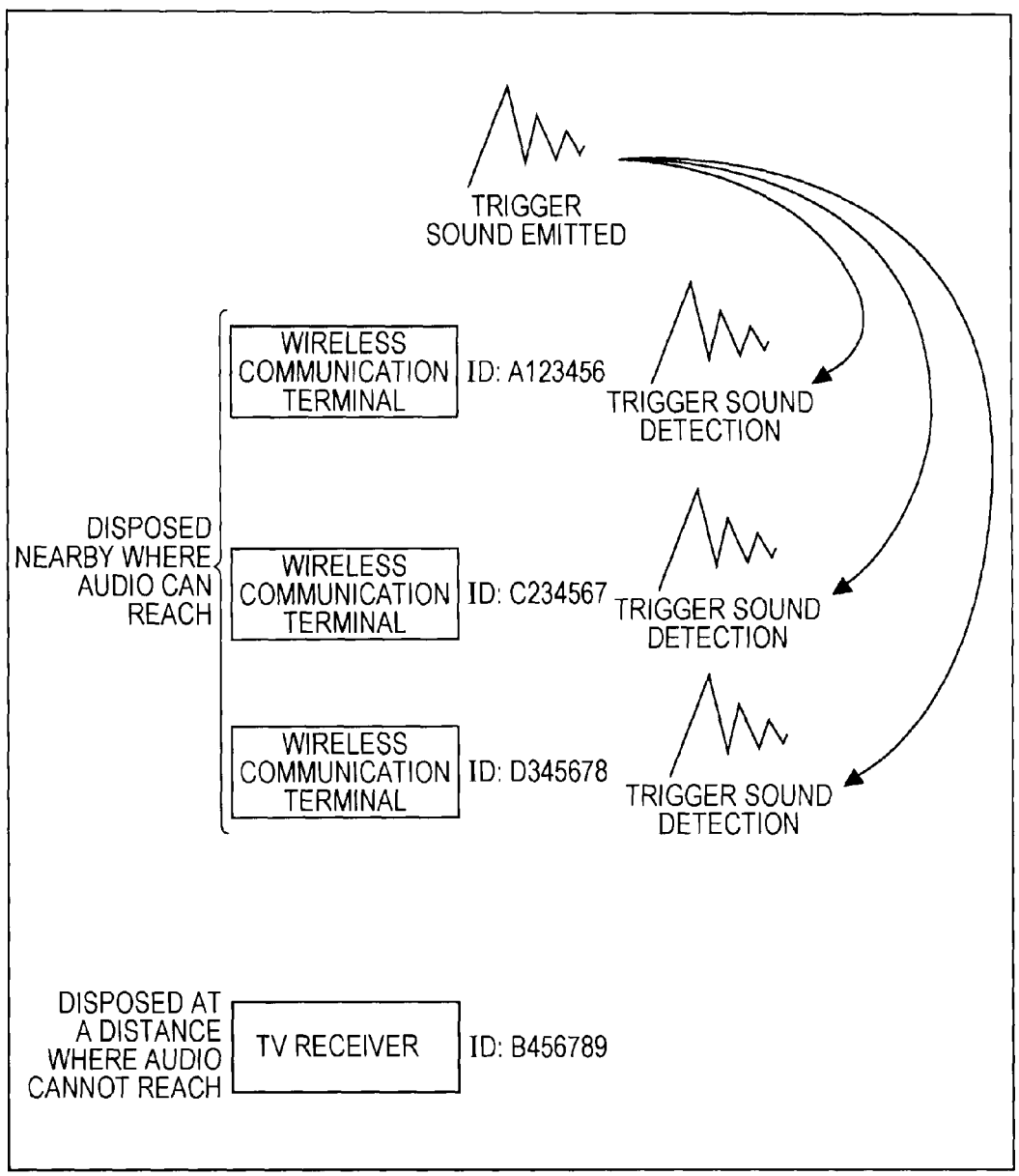
FIG. 13 is a diagram to describe a situation wherein for example a tapping sound occurring on the outside is detected as a trigger sound by a wireless communication terminal disposed nearby, in the event of near field wireless communication pairing according to a tenth embodiment.

With the pairing method of the tenth embodiment, as shown in FIG. 13, upon the tapping sound (trigger sound) occurring by a user tapping something with a finger or the like for example, the wireless communication terminals, disposed at a near distance whereby audio can be transmitted, will receive the tapping sound thereof with a microphone.

Figure 14:
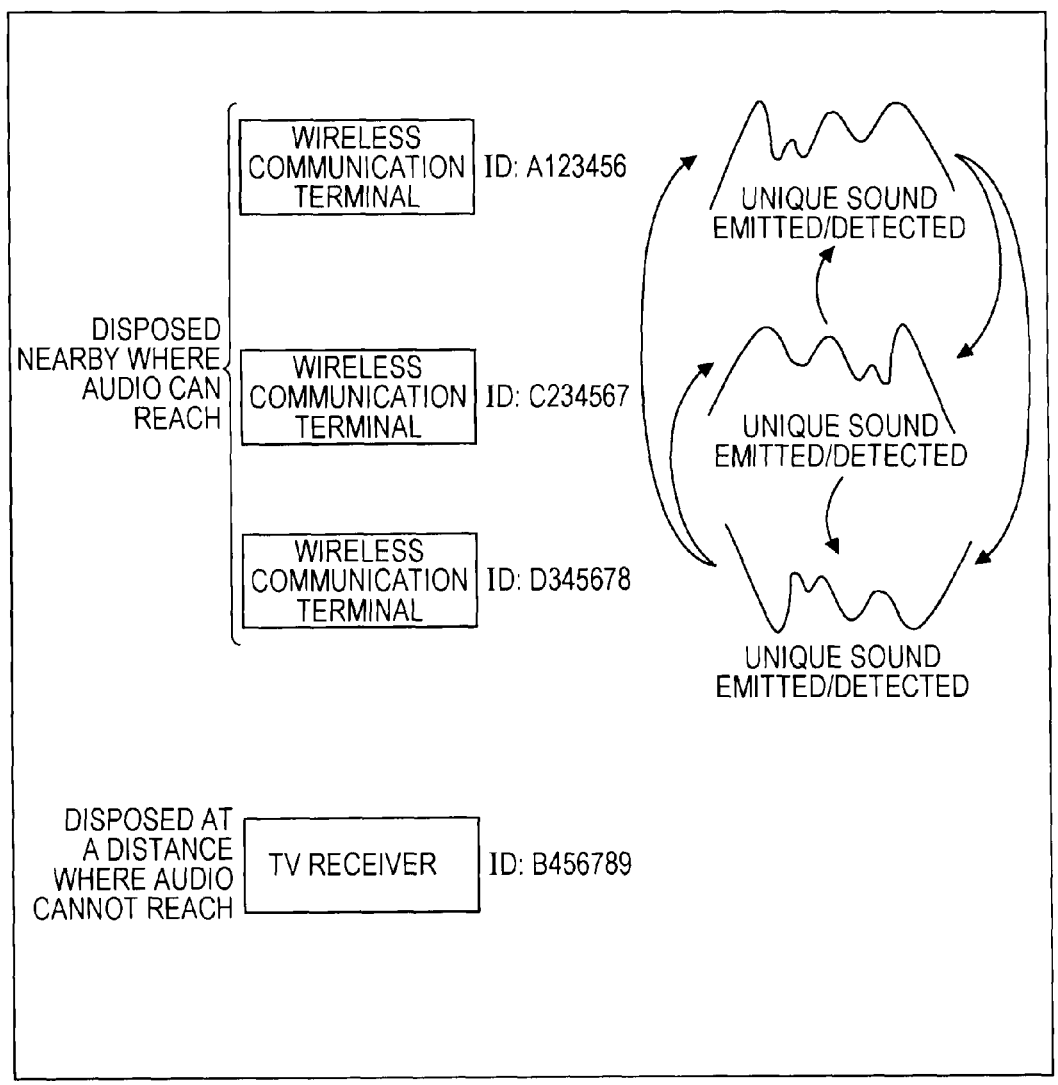
FIG. 14 is a diagram to describe a situation in the tenth embodiment wherein the wireless communication terminals having detected the trigger sound each approximately simultaneously emit individual sounds, and wherein the terminals each detect the individual sounds emitted by the other wireless communication terminals.
Figure 15:
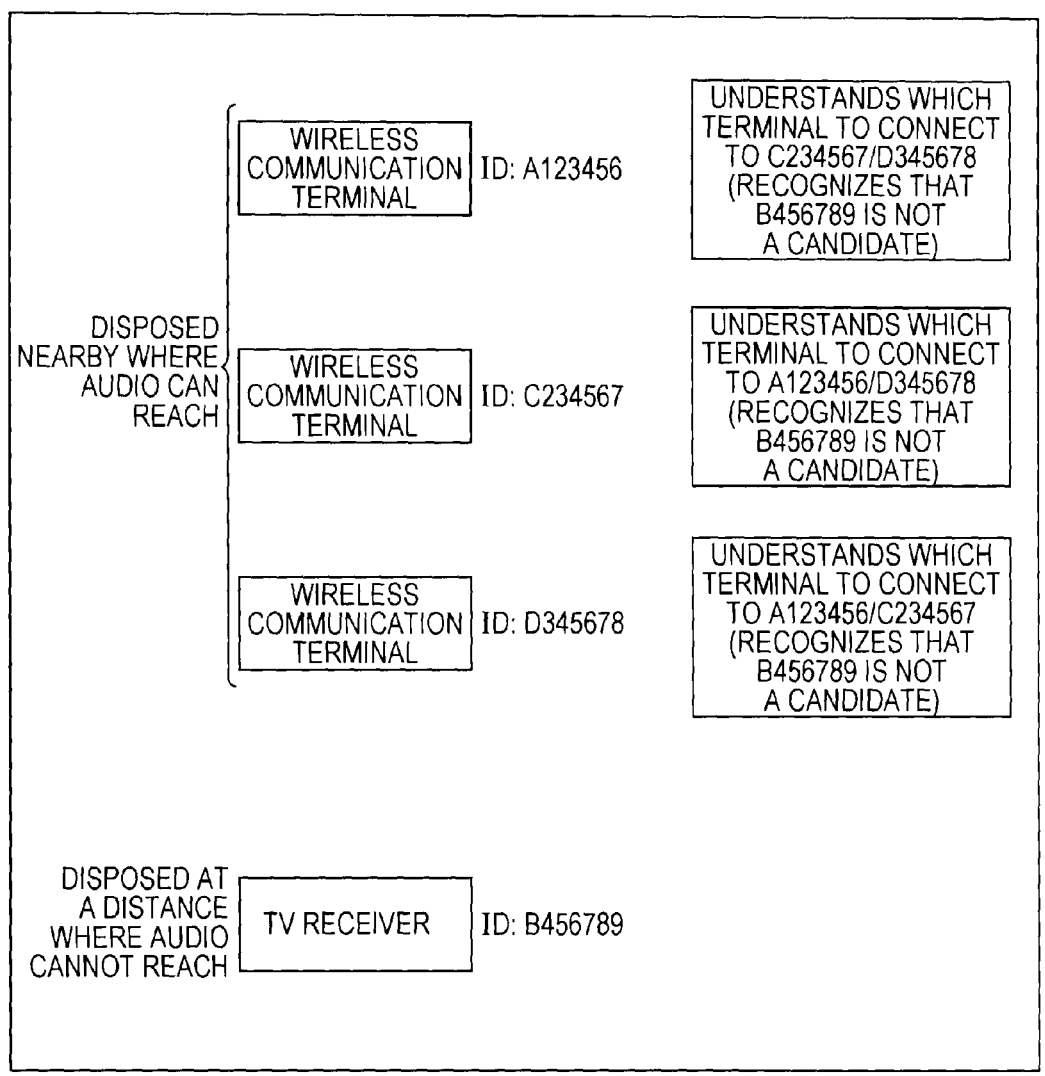
FIG. 15 is a diagram to describe a situation in the tenth embodiment wherein, based on the individual sounds from the other terminals detected by each of the wireless communication terminals, each understands the wireless communication terminal with which to be paired.

The wireless communication terminals having received the tapping sound, each output the unique sounds described above, at approximately the same time, from the speakers, as shown in FIG. 14. Thus, the wireless communication terminals disposed at a near distance mutually receive the unique sounds with the microphones output by the other terminals.

The wireless communication terminals having taken in the unique sounds from the other terminals restore the ID of the terminal having output the unique sound thereof from the unique sounds taken in (e.g. lower three digits of the ID) and temporarily store this in an internal memory. That is to say in the case of this example, the wireless communication terminal having the ID "A123456" restores "C234567" and "D345678" as the IDs of the other terminals that received the unique sound. Similarly, the wireless communication terminal having the ID "C234567" restores "A123456" and "D345678" as the IDs of the other terminals, and the wireless communication terminal having the ID "D345678" restores "A123456" and "C234567" as the IDs of the other terminals. Note that in the case of this example, the wireless communication device having ID "B456789" exists at a distance where the trigger sound cannot be received, and since this device does not emit a unique sound, the ID of "B456789" is not restored by the terminals.

Also, the wireless communication terminals at this time determine whether or not the IDs restored from the unique sounds are in the access point list generated beforehand by the terminal itself. In the case that an ID restored from the unique sound is in the access point list, the wireless communication terminal corresponding to the ID thereof is understood to be a terminal with which pairing can be performed. That is to say, in the case of this example, the wireless communication terminal having ID "A123456" understands the terminals having ID "C234567" and ID "D345678" to be terminals with which pairing can be performed. Similarly, the wireless communication terminal having ID "C234567" understands the terminals having ID "A123456" and ID "D345678" to be terminals with which pairing can be performed, and the wireless communication terminal having ID "D345678" understands the terminals having ID "A123456" and ID "C234567" to be terminals with which pairing can be performed. Note that in the case of this example, the wireless communication device having ID "B456789" cannot receive the trigger sound, and does not output a unique sound, whereby the wireless communication device having ID "B456789" is not understood to be a terminal with which pairing can be performed.

Figure 16:
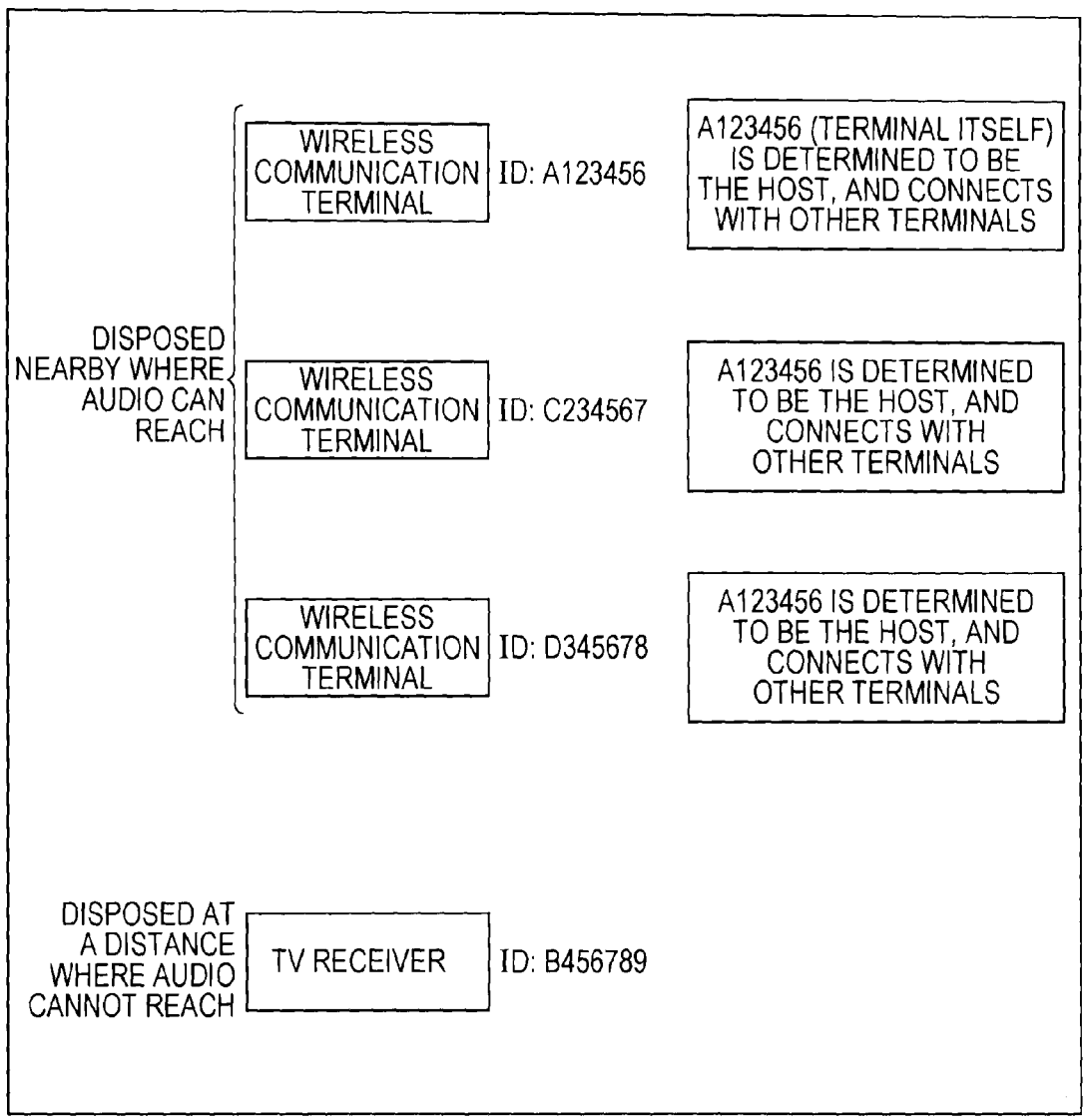
FIG. 16 is a diagram to describe a situation in the tenth embodiment wherein each wireless communication terminal recognizes which terminal will become the host terminal, and that the pairing connection between the terminals is completed.

Subsequently, the wireless communication terminals having understood the other terminals that can be paired with determine the host terminal as shown in FIG. 16, based on ascending/descending orders based on the order of the ID of each terminal, size order of the ASCII codes corresponding to each ID, or common constants for each terminal such as date and time information. That is to say, in the case of this example, the wireless communication terminal having ID "A123456" becomes the host terminal, and the other IDs "C234567" and "D345678" each become guest terminals. To describe in greater detail, the wireless communication terminal having ID "A123456" sets itself as the host terminal, and pairs with the terminals having ID "C234567" and "D345678", each as guest terminals. Also, both of the wireless communication terminals having ID "C234567" and "D345678" recognize the wireless communication terminals having ID "A123456" as the host terminal, and performing pairing with themselves as the guest terminals.

According to the pairing method of the tenth embodiment, processing is started upon receiving a trigger sound such as a tapping sound for example, and the information of IDs and so forth are mutually exchanged by unique sounds between each terminal, for example as compared to exchanging information of IDs and the like with only the same audio conversion method, and situations wherein the correlation between the terminals and the IDs are recognized in error do not happen often.

Also, similar to the above-described sixth through ninth embodiments, in the case of the tenth embodiment, pairing is performed only between wireless communication terminals within a near field range where audio can read, whereby safety is great.

Further, with the tenth embodiment, similar to the ninth embodiment described above, the host terminal and guest terminals are automatically determined, whereby work for the user to determine the host terminal beforehand is not needed.

Note that with the tenth embodiment, an example is given wherein IDs are mutually exchanged between terminals with unique sounds, but IDs can be mutually exchanged between terminals with a unique vibrator vibration or the like, for example. However, in this case, the terminals will need a vibratory waveform medium through which vibrator vibrations can be transmitted, such as the above described cases or desk or the like, for example.

Figure 17:
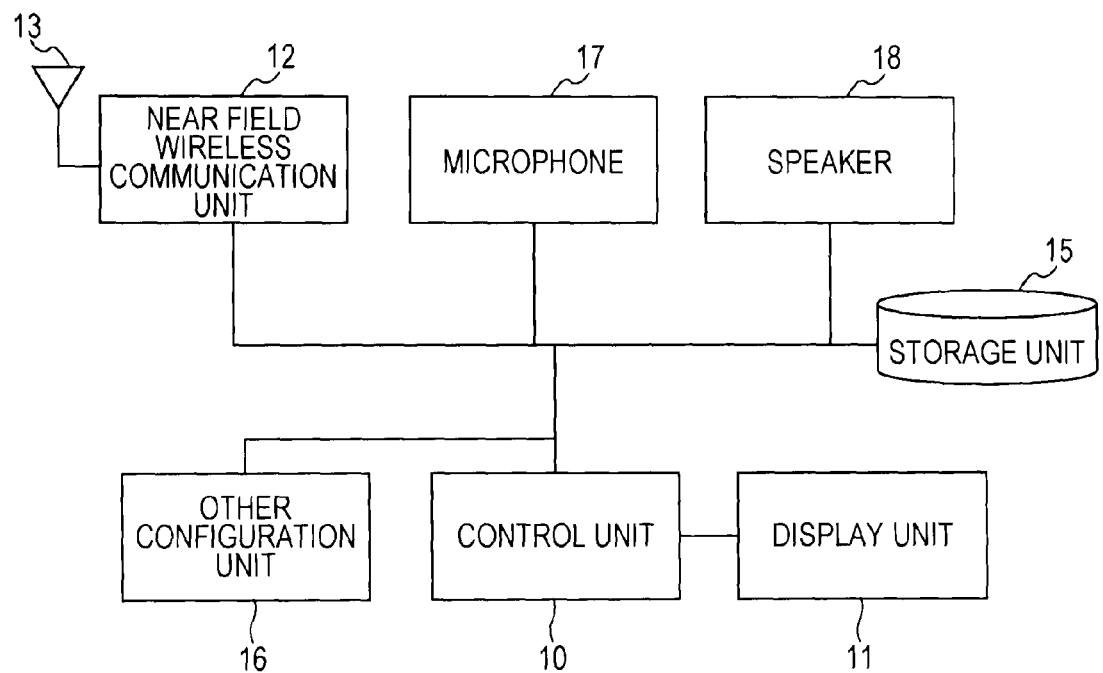
FIG. 17 is a block diagram illustrating a schematic configuration of primary portions of a wireless communication terminal which can correspond to the sixth through ninth embodiments according to the present invention.

[Overall Configuration of Wireless Communication] Terminals according to the Present Embodiment FIG. 17 shows a schematic block diagram of the wireless communication terminals that can correspond to the sixth through tenth embodiment. Note that FIG. 17 shows only the primary configurations relating to the embodiments of the present invention. That is to say, the wireless communication terminal according to the present embodiment has various types of components which a general wireless communication terminal has, but FIG. 17 omits these.

In FIG. 17, the near field wireless communication unit 12 have an antenna 13 for near field wireless communication, and perform near field wireless communication, similar to the configuration in FIG. 4.

The microphone 17 takes in external audio. In the case of the present embodiment, the microphone 17 has an amplifier that amplifies the signals of the external audio taken in and an analog-digital converter that converts the analog signals of the external audio after amplification into digital data. That is to say, in the case of the present embodiment, the microphone has a function of a vibratory waveform detecting unit for detecting a physical audio vibratory waveform that is transmitted via the air. The digital audio data from the microphone 17 is transmitted to the control unit 10. Note that in the case of pairing the audio data as with the above-described sixth through tenth embodiments, the audio data can be temporarily stored in the storage unit 15 under the control of the control unit 10.

The speaker 18 outputs audio externally. In the case of the present embodiment, the speaker 18 has a digital-analog converter that converts the digital audio data supplied from the control unit 10 or the like into an analog audio signal, and an amplifier to amplify the analog audio signal thereof, for example. That is to say, in the case of the present embodiment, the speaker 18 has the function of a vibratory waveform generating unit to generate a physical audio vibratory waveform that is transmitted via the air.

The storage unit 15 is made up of memory similar to the configuration in FIG. 4 described above. The re-writable ROM of the storage unit 15 stores various types of programs such as the OS programs and device drivers or the like, as described above, the ID of the terminal itself, various types of initial setting values, and one or a combination of pairing control application programs according to the sixth through tenth embodiments of the present invention, and so forth. Also, the re-writable ROM can store various types of information such as information of the access point list described above and the ID used for the list thereof. The RAM is used as a work region in the event of the control unit 10 performing various types of data processing or a buffer region to temporarily store data. Also, in the case of using audio data in the event of pairing as with the sixth through tenth embodiment described above, the RAM can be used as a temporary memory to temporarily store the audio data taken in by the microphone 17, and also to temporarily store the one-time reference data or one-time key data used for pairing. Additionally, the storage unit 15 stores various types of data handled by the wireless communication terminals, similar to that described above. Also according to the present embodiment, similar to the example in FIG. 4, various types of data stored in the storage unit 15 and various types of application programs including the pairing control application program according to the various embodiments of the present invention are not only prepared beforehand at the time of shipping from the factory, but can be obtained via wireless communication or external cables, and the can be obtained from storage media such as external memory or the like wherein the application program thereof is stored.

Similar to the configuration in FIG. 4, the display unit 11 is made up of a display panel provided on the casing of the wireless communication terminal of the present embodiment and a display driving circuit for driving the display panel thereof. The display unit 11 also can display the above-described access point list.

The other configuration unit 16 is a block including various types of configurations which wireless communication terminals normally have, similar to the configuration in FIG. 4 described above.

The control unit 10 controls operations of the components of the wireless communication terminals of the present embodiment, such as the near field wireless communication unit 12, microphone 17, speaker 18, storage unit 15, display unit 11, and other configuration unit 16 and the like, and further performs various types of calculations as needed. Also, the control unit 10 starts and executes various types of programs as needed, including one or a combination of the pairing control application programs in the sixth through tenth embodiments stored in the storage unit 15. Note that as in the sixth embodiment, for example, in the case of converting the terminal ID to generate DTMF audio data, the control unit 10 executes the processing to generate the DTMF audio data from the ID and to restore the ID from the TDMF audio data and so forth. Note that the processing to generate the DTMF audio data from the ID and processing to restore the ID from the TDMF audio data and so forth may be included in the pairing control application program of the present embodiment, or may be separately prepared as a separate application program. Also, as in the tenth embodiment, in the case of emitting a unique sound, the control unit 10 executes processing to emit the unique sound and the processing to restore the ID of the terminal from the unique sound emitted by another terminal.

[Process Flow at time of Pairing Control Application Program Execution using Audio Data]

Figure 18:
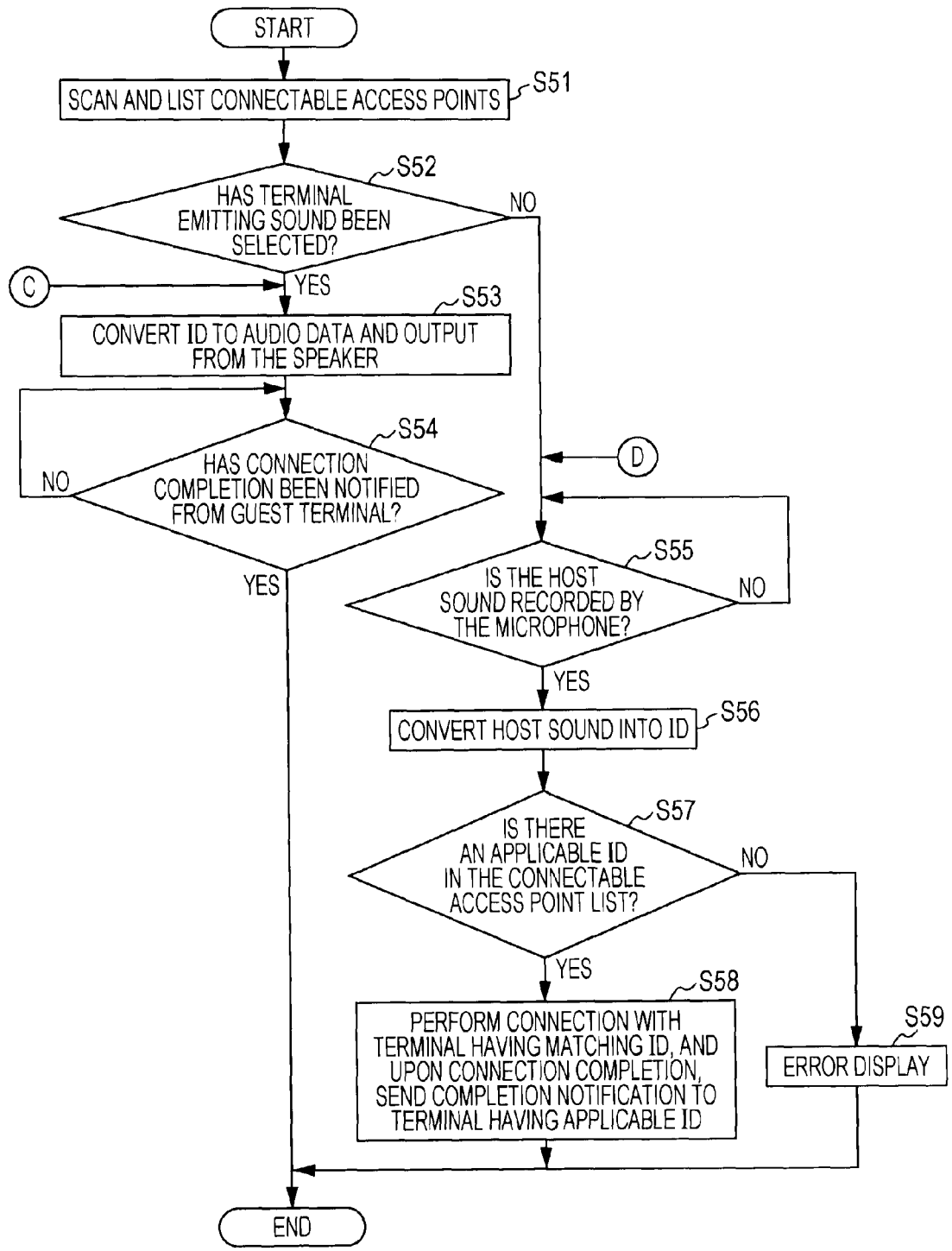
FIG. 18 is a flowchart describing the flow of pairing processing according to the sixth embodiment wherein a control unit in FIG. 17 executes a pairing control application program, and particularly describes the flow of processing of the host terminal and guest terminal.
Figure 19:
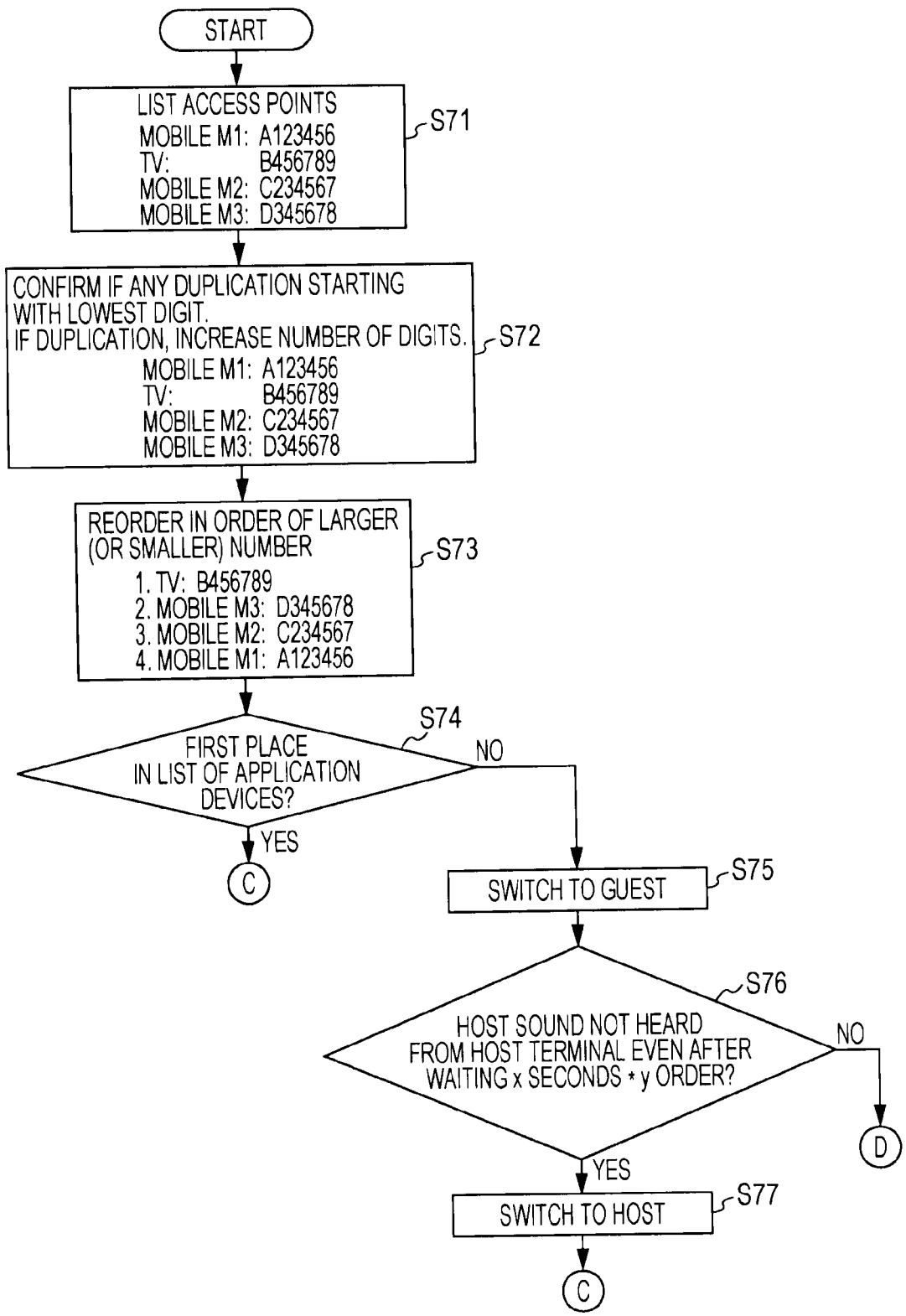
FIG. 19 is a flowchart describing the flow of pairing processing according to the ninth embodiment wherein the control unit in FIG. 17 executes a pairing control application program, and particularly describes the flow of processing of the portions wherein the host terminal and guest terminal are determined automatically.

FIGS. 18 and 19 show a flowchart of the pairing processing of the control unit 10 executing the pairing control application program which uses audio. Note that FIG. 18 shows a flowchart up to the point that the pairing processing of the host terminal and guest terminals is completed, as the host terminal is determined by user selection, the ID of the host terminal is converted into DTMF audio and output, and ID comparison in the access point list is performed with the guest terminals, as in the sixth embodiment. Also, FIG. 19 shows a flowchart up to the point that the wireless communication terminals each become the host terminal or guest terminals, as in the ninth embodiment.

First, the flow of a series of processing from the host terminal selection by the user up to completion of the pairings of each terminal will be described with reference to the flowchart in FIG. 18. Note that the flowchart in FIG. 18 shows the flow of processing in the case that, upon the pairing control application program of the present embodiment having started, the pairing mode of the near field wireless communication managed by this program is in user selection mode.

In FIG. 18, in the case that the pairing control application program of the present embodiment has started, and the pairing mode of the near field wireless communication managed by this program is in user selection mode, first as the processing in step S51 the control unit 10 controls the near field wireless communication unit 12 to scan all of the wireless communication devices existing within an area that near field wireless communication can be performed. The control unit 10 then generates an access point list of all of the wireless communication terminals obtained by the scan. Also, the control unit 10 displays the access point list thereof on a screen on the display unit 11, as needed. After the processing in step S51, the control unit 10 advances the flow to step S52.

Upon advancing to the processing in step S52, the control unit 10 determines whether or not selection instructions have been input, indicating the user to have selected the terminal itself as the host terminal, i.e. indicating the user to have selected the terminal which outputs the host sound generated from the terminal itself as described above. Note that the user interface in the event of the user selecting one of the host terminal or guest terminal is not particularly restricted, and for example a selecting using a touch panel or key/button, or selecting via audio may be used. Also, other than the determination according to selection instructions from the user, for example when no instructions to select the host terminal are input within a fixed amount of time, the terminal itself is automatically selected to be a guest terminal, or conversely, when no instructions to select the host terminal are input within a fixed amount of time, the terminal itself is automatically selected to be the host terminal. In the determining processing in step S52, the control unit 10 advances the processing to step S53 in the case that the terminal outputting the host sound is selected, and advances the processing to step S55 in other cases (in the case that the guest terminal is selected).

Upon advancing to the processing in step S53, the ID of the terminal itself stored in the storage unit 15 is converted by DTMF into audio data and output from the speaker 18. After the processing in step S53, the control unit 10 advances the processing to step S54.

Upon advancing to the processing in step S54, the control unit 10 determines whether or not a connection completion notification of the pairing is received from the guest terminal through the near field wireless communication unit 12. In the determining processing in step S54, upon determining that the connection completion notification has been received from the guest terminal, the control unit 10 ends the processing in the flowchart in FIG. 18, as the pairing having ended. Note that in the case of the flowchart in FIG. 18, the control unit 10 continues the determining processing in step S54 until a connection completion notification is received from the guest terminal, but in the case that a connection completion notification is not received even after a predetermined fixed amount of time has passed, for example an error message indicating pairing failure is displayed on the display unit 11, after which the flowchart processing may be ended. Alternatively, in the case that a connection completion notification is not received from the guest terminal even after a predetermined fixed amount of time has passed, the control unit 10 may return the processing to step S53 and repeat the processing to output the host sound again a predetermined number of times, such as two or three times.

Also, in the case that the guest terminal is selected in step S52 and the processing is advanced to step S55, the control unit 10 determines whether or not the host sound output by the host terminal has been received with the microphone 17. In the case determination is made in step S55 that the host sound has been taken in, the processing is advanced to step S56. Note that in the case of the flowchart in FIG. 18, the control unit 10 continues the determining processing in step S55 until the host sound is taken in, but in the case that the host sound is not taken in even after a predetermined fixed amount of time has passed, for example an error message indicating pairing failure may be displayed on the display unit 11, and the processing of the flowchart ended.

If determination is made in step S55 that the host sound has been taken in, and the processing is advanced to step S56, the control unit 10 restores the ID of the host terminal from the host sound. After the processing in step S56, the control unit 10 advances the processing to step S57.

Upon advancing the processing to step S57, the control unit 10 determines whether or not the host terminal ID restored in step S56 has been included in the access point list generated beforehand, and in the case the host terminal ID is included, the processing is advanced to step S58.

On the other hand, in the case that within the access point list, an ID matching the ID restored from the host sound is not included in the access point list, the control unit 10 advances the processing to step S59, and upon displaying an error message indicating pairing failure, the processing in the flowchart is ended.

Upon determining that an ID matching the ID obtained from the host sound exists in the access point list and advancing the processing to step S58, the control unit 10 performs pairing with the terminal corresponding to the matching ID. Upon the pairing having been completed, the control unit 10 transmits the pairing completion notification to the terminal corresponding to the matched ID, through the near field wireless communication unit 12.

Subsequently, the control unit 10 ends the processing in the flowchart herein.

Next, the processing flow up to the point that the wireless communication terminal becomes the host terminal itself, for example, based on the IDs in the access point list, will be described with reference to FIG. 19 as in the ninth embodiment. That is to say, the flowchart in FIG. 19 shows the processing flow in the case that, upon the pairing control application program of the present embodiment having started, the pairing mode of the near field wireless communication managed by the program is in automatic selection mode.

In FIG. 19, in the case that the pairing control application program of the present embodiment is started, and further if the pairing mode is in automatic selection mode, the control unit 10 controls the near field wireless communication unit 12 to scan all of the wireless communication devices existing in an area where near field wireless communication can be performed, as the processing in step S71, similar to step S51. The control unit 10 generates an access point list including all of the wireless communication terminals obtained by the scan. Also, the control unit 10 displays the access point list on a screen of the display unit 11 as needed. After the processing in step S71, the control unit 10 advances the processing to step S72.

In the case that the access point list as exemplified in FIG. 8 above is generated, upon advancing the processing to step S72, the control unit 10 compares the values for a predetermined number of digits for each ID in the access point list, similar to the flowchart in FIG. 7, and checks whether or not two or more IDs having the same predetermined number of digits. Upon determining that there are no IDs having the same value of the predetermined number of digits, the control unit 10 advances the processing to step S73.

Upon advancing the processing to step S73, the control unit 10 rearranges the IDs having different values of the predetermined number of digits in order of the numerical values within the predetermined number of digits, similar to the flowchart in FIG. 7. After the sorting processing in step S73, the control unit 10 advances the processing to step S74.

Upon advancing the processing to step S74, similar to the flowchart in FIG. 7, the control unit 10 makes determinations only regarding IDs, out of the sorted IDs, of devices in a category that can correspond to the pairing control application program of the present embodiment, and determines whether the ID corresponding to the device itself is first place in terms of numerical value of the predetermined number of digits. In the case of determining that the ID of the terminal itself is first place in terms of numerical value of the predetermined number of digits during the determining processing in step S74, the control unit 10 sets the terminal itself to be the host terminal, and advances the processing to step S53 and beyond in FIG. 18.

On the other hand, in the case of determining that the ID of the terminal itself is not first place in terms of numerical value of the predetermined number of digits, almost the same as with the flowchart in FIG. 7 described above, the control unit 10 advances the processing to step S75, and the terminal itself is set to be a guest terminal. After the processing in step S75, the control unit 10 advances the processing to step S76.

Upon advancing to the processing in step S76, almost the same as with the flowchart in FIG. 7, the control unit 10 awaits the host sound from the host terminal side for a predetermined amount of time corresponding to the order of the terminal itself. Note that in the case of the flowchart in FIG. 19, similar to the flowchart in FIG. 7, the host sound from the host terminal side is awaited for an amount of time whereby a predetermined fixed amount of time (x seconds) is multiplied by "3" which is the order that the terminal itself is in (x seconds×3).

In the determining processing in step S76, in the case there is a host sound from the host terminal side before the predetermined amount of time has passed, the control unit 10 advances the processing to step S55 in FIG. 18.

On the other hand, in the case that the host sound is not received from the host terminal side even after the predetermined amount of time has passed, the control unit 10 advances the processing to step S77, sets the terminal itself to be the host terminal, and advances the processing to step S64 in FIG. 18.

Figure 20:
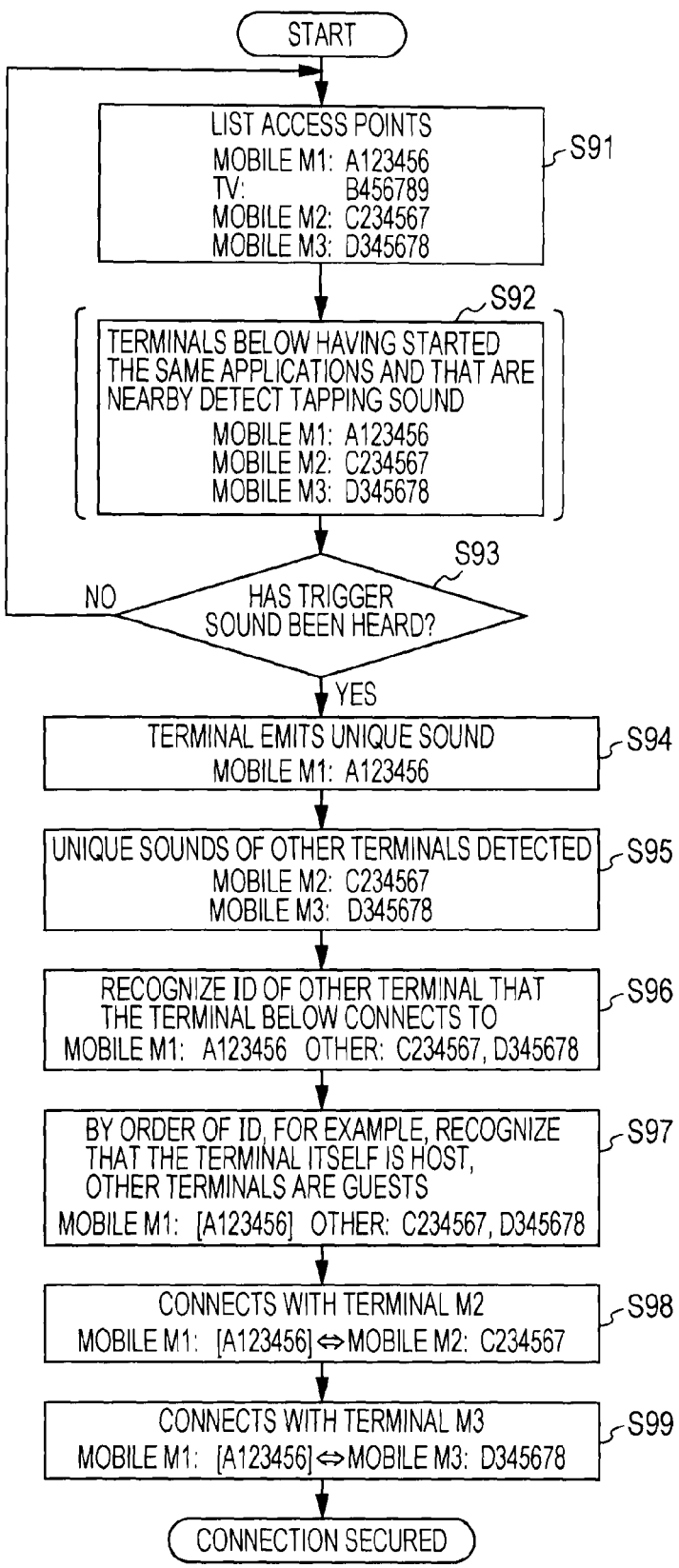
FIG. 20 is a flowchart describing the flow of pairing processing according to the tenth embodiment wherein the control unit in FIG. 17 executes a pairing control application program, and particularly describes the flow of processing in the event that the host terminal is determined.
Figure 21:
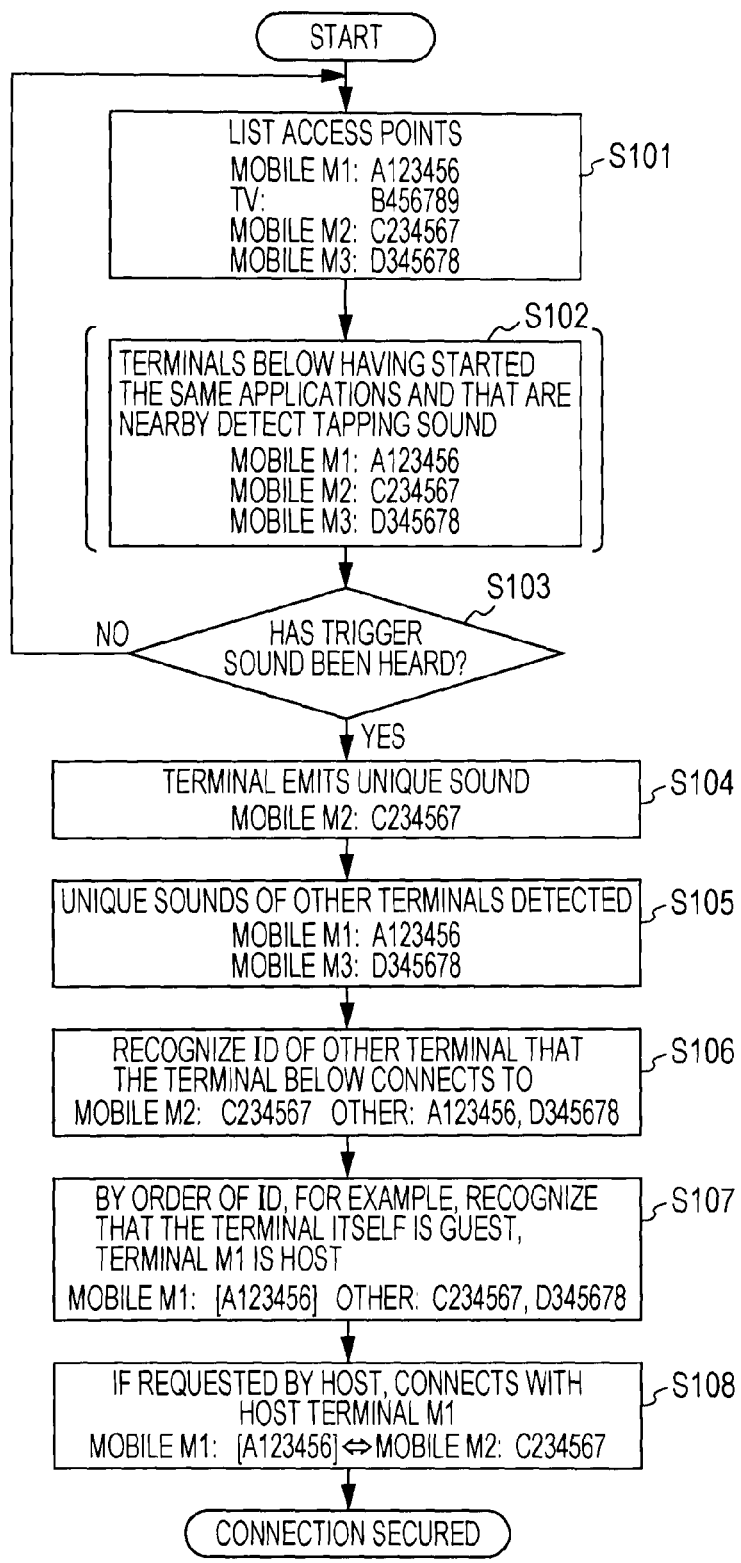
FIG. 21 is a flowchart describing the flow of pairing processing according to the tenth embodiment wherein the control unit in FIG. 17 executes a pairing control application program, and particularly describes the flow of processing in the event that the guest terminal is recognized by the host terminal.

Next, FIGS. 20 and 21 are flowcharts of the pairing processing as the control unit 10 executes the pairing control application program corresponding to the tenth embodiment. Note that the flowcharts in FIGS. 20 and 21 show the flow of the processing in the case that, after the pairing control application program of the present embodiment has started, the near field wireless communication pairing mode managed by the program herein is set to automatic selection mode. Also, FIG. 20 is a flowchart particularly in the event of determining the host terminal (in this example, the wireless communication terminal having the ID "A123456"), and FIG. 21 is a flowchart in the event of the guest terminal (in this example, the wireless communication terminal having the ID "C234567") recognizing the host terminal.

First, the flowchart in FIG. 20 will be described.

In the flowchart in FIG. 20, in the case that the pairing control application program of the present embodiment has been started and the pairing mode is set to automatic selection mode, the control unit 10 controls the near field wireless communication unit 12 to scan all of the wireless communication devices existing within an area where near field wireless communication can be performed as the processing in step S91, similar to step S71. The control unit 10 generates an access point list including all of the wireless communication terminals obtained by the scan. Also, the control unit 10 displays the access point list thereof on a screen on the display unit 11, as needed. After the processing in step S91 herein, the control unit 10 advances the processing to step S92.

Note that the processing in step S92 is shared processing between the wireless communication terminals existing within a near field wherein the trigger sound can be detected, and with the pairing control application program of the present embodiment having been started. In the case of advancing to the processing in step S92, the control unit 10 is in a detection awaiting state for the trigger sound such as a tapping sound. In the case of the tenth embodiment, in step S92 the wireless communication terminals existing within a near field wherein the trigger sound can be detected, and with the pairing control application program of the present embodiment having been started, are the wireless communication terminal having the ID "A123456", the wireless communication terminal having the ID "C234567", and the wireless communication terminal having the ID "D345678".

Next, in the processing in step S93, the control unit 10 determines whether or not the trigger sound such as the tapping sound has been received by the microphone 17. In the case that the trigger sound is detected in the determining processing in step S93, the control unit 10 advances the processing to step S94, and in the case that the trigger sound cannot be heart, returns the processing to step S91. Note that in the case of the flowchart in FIG. 20, the determining processing in step S93 is continued until the trigger sound is heard, but in the case that the trigger sound is not detected even after a predetermined fixed amount of time has passed, for example, upon displaying an error message indicating trigger sound reception failure, for example, on the display unit 11, the flowchart processing may be ended. Alternatively, in the case that the trigger sound is not detected even after a predetermined fixed amount of time has passed, the control unit 10 may return the processing to step S91 and repeat the processing to await the trigger sound again a predetermined number of times, e.g. two or three times.

Upon detecting the trigger sound and advancing to step S94, the control unit 10 generates the above-described unique sound based on the ID, for example, of the terminal itself, and outputs the unique sound thereof from the speaker 18. Note that the example in the flowchart in FIG. 20 shows the processing in the wireless communication terminal having the ID "A123456", whereby in step S94, the control unit 10 emits the unique sound generated based on the ID "A123456". After the processing in step S94, the control unit 10 advances the processing to step S95.

Upon advancing the processing to step S95, the control unit 10 is in a state whereby the unique sound output by the other wireless communication terminals can be received by the microphone 17. Note that in the case of the flowchart in FIG. 20, the control unit 10 waits until the unique sounds from the other terminals are heard, but in the case that the unique sounds from the other terminals are not detected even after a predetermined fixed amount of time is passed, for example after displaying an error messaging indicating failure to receive the unique sounds from the other terminals on the display unit 11, the processing of the flowchart may be ended. In the processing in step S95, upon detecting the unique sounds of the terminals, i.e. in this example, the unique sound from the wireless communication terminal having ID "C234567" and the unique sound from the wireless communication terminal having ID "D345678", the control unit 10 advances the processing to step S96.

Upon advancing the processing to step S96, the control unit 10 restores the ID from the unique sounds emitted by the other terminals, and recognize the wireless communication terminals of the IDs thereof. In the case of the flowchart in FIG. 20, the control unit 10 of the wireless communication terminal having the ID "A123456" restores "C234567" and "D345678" as IDs of the other terminals. After the processing in step S96, the control unit 10 advances the processing to step S97.

Next, in the processing in step S97, the control unit 10 recognizes the host terminal and guest terminals based on the order of IDs within the access point list and so forth, as described above. In the case of the flowchart in FIG. 20, the control unit 10 of the wireless communication terminal having the ID "A123456" recognizes that the terminal itself is the host terminal, and also recognizes the wireless communication terminals having ID "C234567" and ID "D345678" as the guest terminals. After the processing in step S97, the control unit 10 advances the processing to step S98.

Upon advancing the processing to step S98, the control unit 10 completes the pairing between those recognized as guest terminals, e.g. the wireless communication terminal having ID "C234567".

Also, in the processing in step S99, the control unit 10 completes the pairing between those recognized as guest terminals, e.g. the wireless communication terminal having ID "D345678".

Next, the flowchart in FIG. 21 will be described.

In the flowchart in FIG. 21, in the case that the pairing control application program of the present embodiment has been started and the pairing mode is set to automatic selection mode, the control unit 10 controls the near field wireless communication unit 12 to scan all of the wireless communication devices existing within an area where near field wireless communication can be performed as the processing in step S101, similar to step S91. The control unit 10 generates an access point list including all of the wireless communication terminals obtained by the scan. Also, the control unit 10 displays the access point list thereof on a screen on the display unit 11, as needed. After the processing in step S101 herein, the control unit 10 advances the processing to step S102.

Note that the processing in step S102 is shared processing between the wireless communication terminals existing within a near field wherein the trigger sound can be detected, and with the pairing control application program of the present embodiment having been started, similar to step S92 in FIG. 20. In the case of advancing to the processing in step S102, the control unit 10 is in a detection awaiting state for the trigger sound such as a tapping sound. In the case of the tenth embodiment, in step S102 the wireless communication terminals existing within a near field wherein the trigger sound can be detected, and with the pairing control application program of the present embodiment having been started, are the wireless communication terminal having the ID "A123456", the wireless communication terminal having the ID "C234567", and the wireless communication terminal having the ID "D345678".

Next, in the processing in step S103, the control unit 10 determines whether or not the trigger sound such as the tapping sound has been received by the microphone 17. In the case that the trigger sound is detected in the determining processing in step S103, the control unit 10 advances the processing to step S104, and in the case that the trigger sound cannot be heart, returns the processing to step S101. Note that in the case of the flowchart in FIG. 21, the determining processing in step S103 is continued until the trigger sound is heard, but in the case that the trigger sound is not detected even after a predetermined fixed amount of time has passed, for example, upon displaying an error message indicating trigger sound reception failure, for example, on the display unit 11, the flowchart processing may be ended. Alternatively, in the case that the trigger sound is not detected even after a predetermined fixed amount of time has passed, the control unit 10 may return the processing to step S101 and repeat the processing to await the trigger sound again a predetermined number of times, e.g. two or three times.

Upon detecting the trigger sound and advancing to step S104, the control unit 10 generates the above-described unique sound based on the ID, for example, of the terminal itself, and outputs the unique sound thereof from the speaker 18. Note that the example in the flowchart in FIG. 21 shows the processing in the wireless communication terminal having the ID "C234567", whereby in step S94, the control unit 10 emits the unique sound generated based on the ID "C234567". After the processing in step S104, the control unit 10 advances the processing to step S105.

Upon advancing the processing to step S95, the control unit 10 is in a state whereby the unique sound output by the other wireless communication terminals can be received by the microphone 17. Note that in the case of the flowchart in FIG. 20, the control unit 10 waits until the unique sounds from the other terminals are heard, but in the case that the unique sounds from the other terminals are not detected even after a predetermined fixed amount of time is passed, for example after displaying an error messaging indicating failure to receive the unique sounds from the other terminals on the display unit 11, the processing of the flowchart may be ended. In the processing in step S95, upon detecting the unique sounds of the terminals, i.e. in this example, the unique sound from the wireless communication terminal having ID "C234567" and the unique sound from the wireless communication terminal having ID "D345678", the control unit 10 advances the processing to step S96.

Upon advancing the processing to step S106, the control unit 10 restores the ID from the unique sounds emitted by the other terminals, and recognize the wireless communication terminals of the IDs thereof. In the case of the flowchart in FIG. 21, the control unit 10 of the wireless communication terminal having the ID "C234567" restores "A123456" and "D345678" as IDs of the other terminals. After the processing in step S106, the control unit 10 advances the processing to step S107.

Next, in the processing in step S107, the control unit 10 recognizes the host terminal and guest terminals based on the order of IDs within the access point list and so forth, as described above. In the case of the flowchart in FIG. 21, the control unit 10 of the wireless communication terminal having the ID "C234567" recognizes that the wireless communication terminal having the ID "A123456" is the host terminal, while recognizing itself to be the guest terminal. Also, at the same time, the control unit 10 recognizes the wireless communication terminal having the ID "D345678" is also a guest terminal. After the processing in step S107, the control unit 10 advances the processing to step S108.

Upon advancing the processing to step S108, the control unit 10 completes the pairing with the wireless communication terminal having the ID "A123456" which is recognized as the host terminal.

[Summary]

The wireless communication device on the host side according to the embodiments of the present invention as described above include a near field wireless communication unit to perform near field wireless communication, a list generating unit to generate a list of wireless communication devices that can perform near field wireless communication with a near field wireless communication unit; a vibratory waveform detecting unit to detect physical vibratory waveforms transmitted via a predetermined vibratory waveform medium, a storage unit to store the physical vibratory waveform data detected by the vibratory waveform detecting unit as reference data; and a control unit to receive the key data corresponding to physical vibratory waveforms approximately the same as the physical vibratory waveforms detected by the vibratory waveform detecting unit from the wireless communication devices in the list, through the near field wireless communication unit; and when the key data and the reference data stored in the storage unit match, the control unit performs near field wireless communication pairing with the wireless communication device that has transmitted the key data thereof.

According to the embodiments of the present invention, the vibratory waveform detecting unit detects the vibratory waveforms resulting in the vibrations applied externally as to a casing of the wireless communication device serving as the predetermined vibratory waveform medium.

Also, the wireless communication device according to the embodiments of the present invention has a host determining unit wherein, the list generating unit generates the list including identification numbers of the wireless communication device, and determines whether or not the device itself will be the near field wireless communication host based on the numerical order of the identification number.

The pairing control program for near field wireless communication in a host device according to the embodiments of the present invention operates a control computer within a wireless communication device, with a list generating unit to generate a list of wireless communication devices that can perform near field wireless communication with a near field wireless communication unit; a storage control unit that stores physical vibratory waveform data, wherein the physical vibratory waveforms are transmitted via a predetermined vibratory waveform medium and detected by the vibratory waveform detecting unit, in a storage unit as reference data; and a pairing control unit to receive the key data corresponding to physical vibratory waveforms similar to the physical vibratory waveforms detected by the vibratory waveform detecting unit from the wireless communication devices in the list, through the near field wireless communication unit; and when the key data and the reference data stored in the storage unit match, the control unit performs near field wireless communication pairing with the wireless communication device that has transmitted the key data thereof.

The storage medium having stored the pairing control program in a host device according to the embodiments of the present invention stores the pairing control program which operates a control computer within a wireless communication device, with a list generating unit to generate a list of wireless communication devices that can perform near field wireless communication with a near field wireless communication unit; a storage control unit that stores physical vibratory waveform data, wherein the physical vibratory waveforms are transmitted via a predetermined vibratory waveform medium and detected by the vibratory waveform detecting unit, in a storage unit as reference data; and a pairing control unit to receive the key data corresponding to physical vibratory waveforms similar to the physical vibratory waveforms detected by the vibratory waveform detecting unit from the wireless communication devices in the list, through the near field wireless communication unit; and when the key data and the reference data stored in the storage unit match, the control unit performs near field wireless communication pairing with the wireless communication device that has transmitted the key data thereof.

Also, the wireless communication device on the host side according to the embodiments of the present invention has a near field wireless communication unit to perform near field wireless communication; a list generating unit to generate a list of wireless communication devices of which near field wireless communication can be performed by the near field wireless communication unit; a vibratory waveform output unit to output the physical vibratory waveforms generated based on the identification information of the device itself, through the vibratory waveform medium; and a control unit which, after the physical vibratory waveform is output from the vibratory waveform output unit and a connection notification transmitted from the wireless communication device within the list is transmitted through the near field wireless communication unit, performs near field wireless communication pairing with the wireless communication device that has transmitted the connection notification.

Now, the vibratory waveform output unit outputs the physical vibratory waveforms made up of audio by vibrating the air which is the predetermined vibratory waveform medium.

Next, of the wireless communication devices according to the embodiments of the present invention, the wireless communication device particularly serving as a guest device has a near field wireless communication unit to perform near field wireless communication; a list generating unit to generate a list of wireless communication devices that can perform near field wireless communication with a near field wireless communication unit; a vibratory waveform detecting unit to detect the physical vibratory waveforms transmitted via a predetermined vibratory waveform medium, a storage unit to store the physical vibratory waveform data detected by the vibratory waveform detecting unit as key data; and a control unit which, after transmitting the key data stored in the storage unit to the wireless communication device serving as the near field wireless communication host of the wireless communication devices in the list, through the near field wireless communication unit, performs near field wireless communication pairing with the wireless communication device serving as the host.

Now, according to the embodiments of the present invention, the vibratory waveform detecting unit detects the vibratory waveforms originating with the vibrations transmitted through the case of the wireless communication device which is the predetermined vibratory waveform medium.

Also, the wireless communication device serving as the guest device according to the embodiments of the present invention generates the list including identification numbers of the wireless communication device with the list generating unit, and has a guest determining unit that, based on the numerical order of the identification numbers, determines whether the device itself will be a near field wireless communication guest, based on the numerical order of the identification numbers.

The pairing control program for near field wireless communication in a guest device according to the embodiments of the present invention operates a control computer within a wireless communication device, with a list generating unit to generate a list of wireless communication devices that can perform near field wireless communication with a near field wireless communication unit; a storage control unit that stores physical vibratory waveform data, wherein the physical vibratory waveforms are transmitted via a predetermined vibratory waveform medium and detected by the vibratory waveform detecting unit, in a storage unit as key data; and a pairing control unit wherein, upon transmitting the key data stored in the storage unit in the wireless communication device serving as the near field wireless communication host of the wireless communication devices in the list, through the near field wireless communication unit, performs near field wireless communication pairing with the wireless communication device serving as the host.

The storage medium having stored the pairing control program for near field wireless communication with the guest device according to the embodiments of the present invention stores the pairing control program that operates the control computer within the wireless communication device, with a list generating unit to generate a list of wireless communication devices that can perform near field wireless communication with a near field wireless communication unit; a storage control unit that stores physical vibratory waveform data, wherein the physical vibratory waveforms are transmitted via a predetermined vibratory waveform medium and detected by the vibratory waveform detecting unit, in a storage unit as key data; and a pairing control unit wherein, upon transmitting the key data stored in the storage unit to the wireless communication device serving as the near field wireless communication host of the wireless communication devices in the list, through the near field wireless communication unit, performs near field wireless communication pairing with the wireless communication device serving as the host.

Also, the wireless communication device on the guest side according to embodiments of the present invention includes a near field wireless communication unit to perform near field wireless communication; a list generating unit to generate a list of wireless communication devices which can perform near field wireless communication with a near field wireless communication unit; a vibratory waveform detecting unit to detect physical vibratory waveforms that are generated based on identification information of the wireless communication device at the transmission source and transmitted through a predetermined vibratory waveform medium; a storage unit to store the physical vibratory waveform detected by the vibratory waveform detecting unit as key data; and a control unit wherein, when the identification information of the wireless communication terminals in the list is reference data, and this reference data and key data match, near field wireless communication pairing is performed with the wireless communication device corresponding to the reference data.

Now, the vibratory waveform detecting unit detects the physical vibratory waveforms made up of the audio when the air, which is the predetermined vibratory waveform medium, vibrates.

Next, the near field wireless communication system according to the embodiments of the present invention is made up of a host-side wireless communication device and guest-side wireless communication device. The host-side wireless communication device generates a list of wireless communication devices that can perform near field wireless communication, stores the physical vibratory waveform data that is transmitted through a predetermined vibratory waveform medium as reference data, receives the key data corresponding to the physical vibratory waveform from the wireless communication device in the list through the near field wireless communication, and when the key data thereof and the reference data stored in the storage unit match, performs near field wireless communication pairing with the wireless communication device that has transmitted the key data. On the other hand, the guest side wireless communication device generates a list of wireless communication devices that can perform near field wireless communication, stores the physical vibratory waveform data that is transmitted from the host-side wireless communication device through a predetermined vibratory waveform medium as key data, and upon transmitting the key data stored in the storage unit to the wireless communication terminals serving as the host side of the wireless communication devices in the list, through the near field wireless communication, performs near field wireless communication pairings with the host-side wireless communication device.

Next, the wireless communication device according to the embodiments of the present invention has a list generating unit to generate a list that includes identification information of the wireless communication devices that can perform near field wireless communication with a near field wireless communication unit; a vibratory waveform output unit to output the physical vibratory waveforms unique to the terminal itself generated based on identification information of the device itself, through a predetermined vibratory waveform medium; a vibratory waveform detecting unit to detect the unique physical vibratory waveforms based on the identification information of another wireless communication terminal within the list, transmitted therefrom via the predetermined vibratory waveform medium; and a control unit to recognize the identification information of the other wireless communication devices in the list from the physical vibratory waveform detected by the vibratory waveform detecting unit and to determine, based on the list, whether or not the device itself is to be the near field wireless communication host.

Now, according to the embodiments of the present invention, the vibratory waveform output unit outputs audio that is propagated through the air, which is the predetermined vibratory waveform medium, as a physical vibratory waveform, and also, the vibratory waveform detecting unit detects the audio that is propagated through the air, which is the predetermined vibratory waveform medium, as a physical vibratory waveform.

Also, the pairing control program of the near field wireless communication according to the embodiments of the present invention operates a control computer within the wireless communication device including a list generating unit to generate a list that includes identification information of the wireless communication devices that can perform near field wireless communication with a near field wireless communication unit; a vibratory waveform output unit to output the physical vibratory waveforms unique to the terminal itself, through a predetermined vibratory waveform medium; a vibratory waveform detecting unit to detect the unique physical vibratory waveforms based on the identification information of the wireless communication terminal; and a control unit to recognize the identification information of the other wireless communication devices in the list from the physical vibratory waveform detected by the vibratory waveform detecting unit and to determine, based on the list, whether or not the device itself is to be the near field wireless communication host.

Also, the near field wireless communication system according to the embodiments of the present invention is made up of a host-side wireless communication device and guest-side wireless communication device. These wireless communication devices include a list generating unit to generate a list that includes identification information of the wireless communication devices that can perform near field wireless communication with a near field wireless communication unit; a vibratory waveform output unit to output the physical vibratory waveforms unique to the terminal itself, through a predetermined vibratory waveform medium; a vibratory waveform detecting unit to detect the unique physical vibratory waveforms based on the identification information of the wireless communication terminal; and a control unit to recognize the identification information of the other wireless communication devices in the list from the physical vibratory waveform detected by the vibratory waveform detecting unit and to determine, based on the list, whether or not the device itself is to be the near field wireless communication host or the guest.

[Advantages of the Embodiments of the Present Invention]

As described above, according to the embodiments of the present invention, physical vibratory waveforms transmitted through a predetermined vibratory waveform medium such as a device casing, a table, or the like or the air are shared between wireless communication devices, and pairing is enabled only between wireless communication devices that can share the physical vibratory waveforms.

Figure 22:
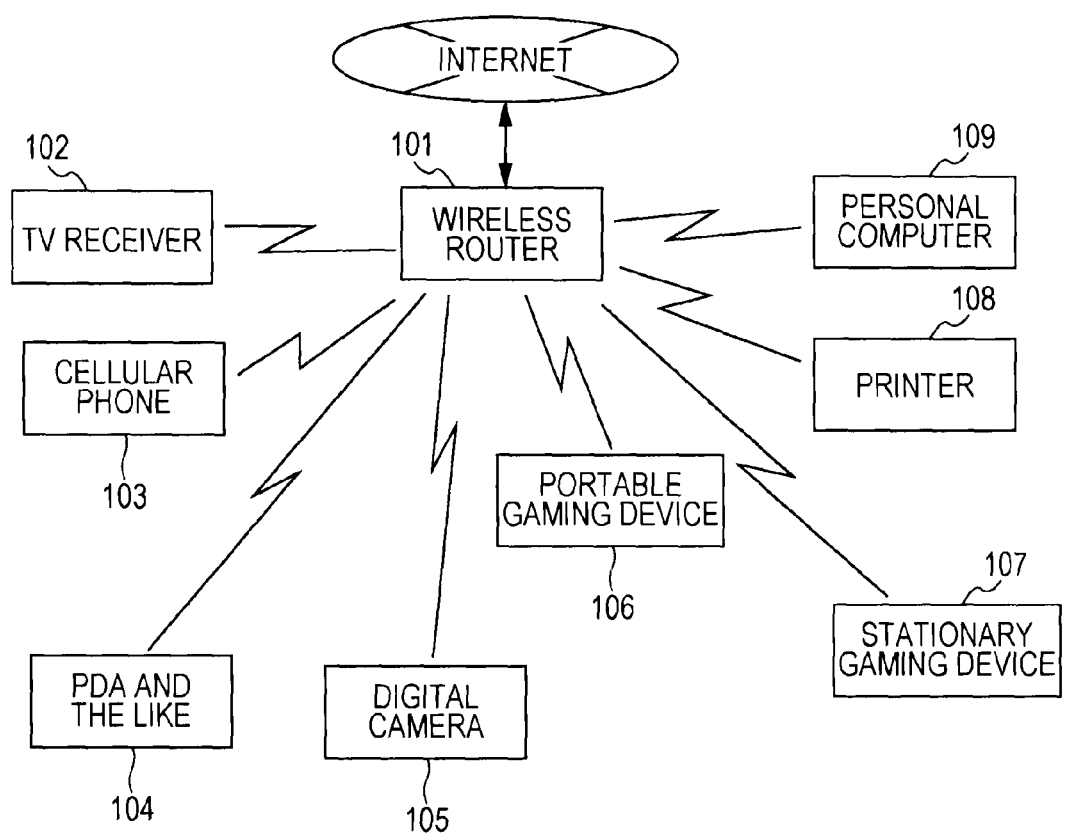
FIG. 22 is a diagram illustrating an example of a near field wireless communication system in the case that the wireless router and each wireless communication device are paired one-to-one.
Figure 23:
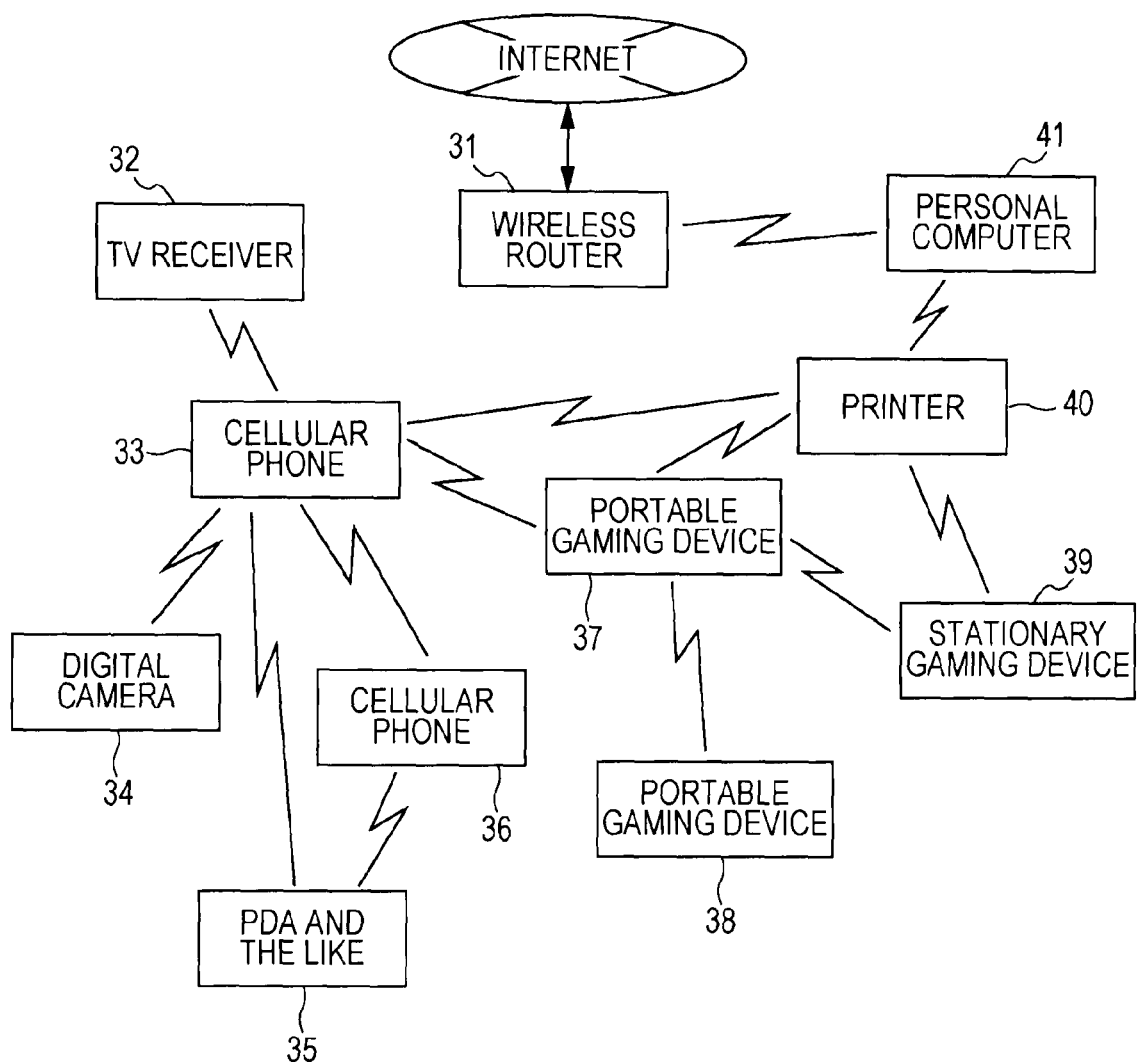
FIG. 23 is a diagram illustrating an example of a near field wireless communication system wherein all of the wireless communication devices including the wireless router can connect one-to-many.

Thus, according to embodiments of the present invention, pairing can be performed easily between desired wireless communication devices that can perform near field wireless communication. That is to say, according to embodiments of the present invention, not only in a case wherein a wireless router 101 and other wireless communication devices 102 through 109 are paired one-to-one as shown in FIG. 22, for example, but pairing can be completed approximately simultaneously in the event of connecting one-to-many, such as so-called WiFi Direct (registered trademark) wherein all of the wireless communication devices 31 through 41 including the wireless router can be connected, as shown in FIG. 23 for example. Particularly, in the case of WiFi Direct, if there are a large number of wireless communication devices in an area where near field wireless communication can be performed, a huge number of IDs and so forth are written in the access point list, whereby selecting the ID for a desired terminal one at a time from the access point list becomes an extremely complex and time-consuming task. Conversely, according to the pairing method of the present embodiment, multiple wireless communication devices can be connected at approximately the same time, whereby the user tasks are greatly simplified and the tasks can be completed in a much shorter time.

Note that the descriptions of the embodiments described above are only examples of the present invention. Accordingly, the present invention is not restricted to the above-described embodiments; rather, various modifications may be made according to design and the like, within the scope and technical idea of the present invention.

REFERENCE SIGNS LIST

1: wireless communication terminal (host terminal)
2, 3: wireless communication terminals (guest terminals)
9: finger of user
10: control unit
11: display unit
12: near field wireless communication unit
13: antenna for near field wireless communication
14: vibratory waveform detecting unit
15: storage unit
16: other configuration unit
17: microphone
18: speaker
31 through 41, 101 through 109: various types of wireless communication devices

The invention claimed is:
1. A near field wireless communication connection method comprising:
  generating a list of a plurality of near field wireless communication devices, said list including a near field wireless communication device;

tapping, as a stimulus, with an external device to generate a physical vibratory waveform, said plurality of near field communication devices at least partially overlapping one another;

detecting the physical vibratory waveform in response to the stimulus applied to at least one of said plurality of near field wireless communication devices;

storing in a storage unit physical vibratory waveform data, as reference data, regarding said physical vibratory waveform detected in said detecting;

receiving key data transmitted from the near field wireless communication device via near field wireless communication, wherein the key data is generated in correspondence with the physical vibratory waveform; and pairing with the near field wireless communication device when the reference data matches the key data, wherein said plurality of near field communication devices are stacked on one another.

2. The method of claim 1, wherein
said detecting includes detecting said physical vibratory waveform with an acceleration sensor or a microphone.

3. The method of claim 1, further comprising:
generating said physical vibratory waveform as a sound or a mechanical vibration when said stimulus is applied by an external device on at least one of said plurality of near field communication devices that are at least partially overlapping one another.

4. The method of claim 1, wherein
said list of the plurality of near field wireless communication devices includes IDs of the plurality of near field wireless communication devices.

5. The method of claim 4, further comprising:
selecting said near field wireless communication device as a host device from said plurality of near field wireless communication devices.

6. A near field wireless communication connection apparatus comprising:
a list generating unit that generates a list of a plurality of near field wireless communication devices, said list including a near field wireless communication device;
a vibration detector that detects a physical vibratory waveform in response to a stimulus applied to at least one of said plurality of near field wireless communication devices;
a storage unit that stores therein physical vibratory waveform data, as reference data regarding said physical vibratory waveform detected by the vibration detector;
a receiver that receives key data transmitted from the near field wireless communication device via near field wireless communication, wherein the key data is generated in correspondence with the physical vibratory waveform; and
a processor that pairs the near field wireless communication device when the processor determines the reference data matches the key data,
wherein said vibration detector detects tapping, as said stimulus, with an external device to generate said physical vibratory waveform, said plurality of near field communication devices at least partially overlapping one another, and
said plurality of near field communication devices are stacked on one another.

7. The apparatus of claim 6, wherein
said vibration detector being an acceleration sensor or a microphone.

8. The apparatus of claim 6, wherein
said physical vibratory waveform being a sound or a mechanical vibration that is generated when said stimulus is applied by an external device on at least one of said plurality of near field communication devices that are at least partially overlapping one another.

9. The apparatus of claim 6, wherein
said list of the plurality of near field wireless communication devices includes IDs of the plurality of near field wireless communication devices.

10. The apparatus of claim 9, wherein
said apparatus being in said near field wireless device and said near field wireless device being a host device for said plurality of near field wireless communication devices.

11. A computer readable storage device having instructions that when executed by a processor implement a near field wireless communication connection method comprising:
generating a list of a plurality of near field wireless communication devices, said list including a near field wireless communication device;
tapping, as a stimulus, with an external device to generate a physical vibratory waveform, said plurality of near field communication devices at least partially overlapping one another
detecting the physical vibratory waveform in response to the stimulus applied to at least one of said plurality of near field wireless communication devices;
storing in a storage unit physical vibratory waveform data, as reference data regarding said physical vibratory waveform detected in said detecting;
receiving key data transmitted from the near field wireless communication device via near field wireless communication, wherein the key data is generated in correspondence with the physical vibratory waveform; and
pairing of the near field wireless communication device when the reference data matches the key data,
wherein said plurality of near field communication devices are stacked on one another.

12. The computer program storage device of claim 11, wherein
said detecting includes detecting said physical vibratory waveform with an acceleration sensor or a microphone.

13. The computer program storage device of claim 11, wherein the method, further comprising:
generating said physical vibratory waveform as a sound or a mechanical vibration when said stimulus is applied by an external device on at least one of said plurality of near field communication devices that are at least partially overlapping one another.

14. The computer program storage device of claim 11, wherein
said list of the plurality of near field wireless communication devices includes IDs of the plurality of near field wireless communication devices.

15. The computer program storage device of claim 14, wherein the method further comprising:
selecting said near field wireless communication device as a host device from said plurality of near field wireless communication devices.

* * * * *